United States Patent
Xu et al.

(10) Patent No.: US 12,532,227 B2
(45) Date of Patent: Jan. 20, 2026

(54) METHOD AND APPARATUS FOR BEARER TYPE CHANGE IN WIRELESS COMMUNICATION SYSTEM

(71) Applicant: LG Electronics Inc., Seoul (KR)

(72) Inventors: Jian Xu, Seoul (KR); Daewook Byun, Seoul (KR); Seokjung Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 436 days.

(21) Appl. No.: 18/016,979

(22) PCT Filed: Jul. 23, 2021

(86) PCT No.: PCT/KR2021/009563
§ 371 (c)(1),
(2) Date: Jan. 19, 2023

(87) PCT Pub. No.: WO2022/019709
PCT Pub. Date: Jan. 27, 2022

(65) Prior Publication Data
US 2023/0284099 A1  Sep. 7, 2023

(30) Foreign Application Priority Data
Jul. 24, 2020 (KR) .................. 10-2020-0092450

(51) Int. Cl.
*H04W 76/12* (2018.01)
*H04W 36/00* (2009.01)

(52) U.S. Cl.
CPC ....... *H04W 36/0007* (2018.08); *H04W 76/12* (2018.02)

(58) Field of Classification Search
CPC ... H04W 76/12; H04W 4/06; H04W 36/0007; H04W 28/09642; H04W 47/127; H04W 28/0284
See application file for complete search history.

(56) References Cited

U.S. PATENT DOCUMENTS

2010/0128649 A1   5/2010 Gonsa et al.
2013/0294321 A1  11/2013 Wang et al.
(Continued)

FOREIGN PATENT DOCUMENTS

WO  WO 2012/019460   2/2012

OTHER PUBLICATIONS

3GPP, "3rd Generation Partnership Project; Technical Specification Group Services and System Aspects; Study on architectural enhancements for 5G multicast-broadcast services (Release 17)," TR 23.757 V0.4.0, Presented at Jun. 2020, 157 pages.
(Continued)

*Primary Examiner* — Anez C Ebrahim
(74) *Attorney, Agent, or Firm* — Fish & Richardson P.C.

(57) ABSTRACT

The present disclosure relates to bearer type change in wireless communications. According to various embodiments of the present disclosure, a method performed by a source radio access network (RAN) node in a mobility procedure to a target RAN node in a wireless communication system comprises: providing a multicast-broadcast service (MBS) service via a first bearer; transmitting, to the target RAN node, a handover request message comprising information for the first bearer; receiving, from the target RAN node, a handover response message comprising i) information informing a change of the first bearer to a second bearer, and ii) configuration information for a communication on the second bearer; and transmitting, to a wireless device, the configuration information for the communication on the second bearer.

13 Claims, 12 Drawing Sheets

(56) References Cited

U.S. PATENT DOCUMENTS

| | | | |
|---|---|---|---|
| 2014/0372624 A1 | 12/2014 | Wang et al. | |
| 2019/0268815 A1* | 8/2019 | Zhu | H04W 36/0016 |
| 2021/0258918 A1* | 8/2021 | Hong | H04W 36/0007 |
| 2023/0089037 A1* | 3/2023 | Xie | H04W 28/0268 370/312 |

OTHER PUBLICATIONS

3GPP, "3rd Generation Partnership Project; Technical Specification Group Radio Access Network; NG-RAN; E1 Application Protocol (E1AP) (Release 16)," TS 38.463 V16.1.1, Apr. 2020, 191 pages.

3GPP, "3rd Generation Partnership Project; Technical Specification Group Radio Access Network; NG-RAN; F1 application protocol (F1AP) (Release 16)," TS 38.473 V16.1.0, 240 pages.

Qualcomm Incorrorporated, "Solution to KI#7: Mobility between 5G MBS supporting and 5G MBS non-supporting NG RAN nodes," S2-2004223 (Revision of S2-200xxxx), Presented at SA WG2 Meeting #139E, Electronic meeting, Jun. 1-12, 2020, 3 pages.

ZTE, "KI#7, new solution multicast MBS session handover with Dummy QoS Flow," S2-2004509 (revision of S2-2003962r02), Presented at SA WG2 Meeting #S2-139E, Jun. 1-12, 2020, Electronic, Elbonia, 4 pages.

* cited by examiner

METHOD AND APPARATUS FOR BEARER TYPE CHANGE IN WIRELESS COMMUNICATION SYSTEM

TECHNICAL FIELD

The present disclosure relates to bearer type change in wireless communications.

BACKGROUND

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Work has started in international telecommunication union (ITU) and 3GPP to develop requirements and specifications for new radio (NR) systems. 3GPP has to identify and develop the technology components needed for successfully standardizing the new RAT timely satisfying both the urgent market needs, and the more long-term requirements set forth by the ITU radio communication sector (ITU-R) international mobile telecommunications (IMT)-2020 process. Further, the NR should be able to use any spectrum band ranging at least up to 100 GHz that may be made available for wireless communications even in a more distant future.

The NR targets a single technical framework addressing all usage scenarios, requirements and deployment scenarios including enhanced mobile broadband (eMBB), massive machine-type-communications (mMTC), ultra-reliable and low latency communications (URLLC), etc. The NR shall be inherently forward compatible.

Multicast-broadcast service (MBS) may be used to provide contents to a plurality of UEs. The MBS service may be provided via an MBS bearer to a plurality of UEs. The MBS service may also be provided via a unicast bearer (e.g., data radio bearer (DRB)). To efficient utilization of radio resources for the MBS service, a bearer type (i.e., MBS bearer and/or unicast bearer) may need to be properly selected.

SUMMARY

An aspect of the present disclosure is to provide method and apparatus for bearer type change in a wireless communication system.

Another aspect of the present disclosure is to provide method and apparatus for bearer type change to provide MBS service in a wireless communication system.

Another aspect of the present disclosure is to provide method and apparatus for bearer type change in a mobility procedure in a wireless communication system.

According to various embodiments of the present disclosure, a method performed by a source radio access network (RAN) node in a mobility procedure to a target RAN node in a wireless communication system comprises: providing a multicast-broadcast service (MBS) service via a first bearer; transmitting, to the target RAN node, a handover request message comprising information for the first bearer; receiving, from the target RAN node, a handover response message comprising i) information informing a change of the first bearer to a second bearer, and ii) configuration information for a communication on the second bearer; and transmitting, to a wireless device, the configuration information for the communication on the second bearer.

According to various embodiments, a source radio access network (RAN) node in a mobility procedure to a target RAN node in a wireless communication system comprises: a transceiver; a memory; and at least one processor operatively coupled to the transceiver and the memory, and configured to: provide a multicast-broadcast service (MBS) service via a first bearer; control the transceiver to transmit, to the target RAN node, a handover request message comprising information for the first bearer; control the transceiver to receive, from the target RAN node, a handover response message comprising i) information informing a change of the first bearer to a second bearer, and ii) configuration information for a communication on the second bearer; and control the transceiver to transmit, to a wireless device, the configuration information for the communication on the second bearer.

According to various embodiments, a processor for a wireless device in a wireless communication system is configured to control the wireless device to perform operations comprising: providing a multicast-broadcast service (MBS) service via a first bearer; transmitting, to the target RAN node, a handover request message comprising information for the first bearer; receiving, from the target RAN node, a handover response message comprising i) information informing a change of the first bearer to a second bearer, and ii) configuration information for a communication on the second bearer; and transmitting, to a wireless device, the configuration information for the communication on the second bearer.

According to various embodiments, a computer-readable medium has recorded thereon a program for performing each step of a method on a computer, the method comprising: providing a multicast-broadcast service (MBS) service via a first bearer; transmitting, to the target RAN node, a handover request message comprising information for the first bearer; receiving, from the target RAN node, a handover response message comprising i) information informing a change of the first bearer to a second bearer, and ii) configuration information for a communication on the second bearer; and transmitting, to a wireless device, the configuration information for the communication on the second bearer.

According to various embodiments, a method performed by a wireless device in a wireless communication system comprises: receiving, from a source radio access network (RAN) node, a multicast-broadcast service (MBS) service via a first bearer; performing a mobility from the source RAN node to a target RAN node; receiving, from the target RAN node, configuration information for a communication on a second bearer; and receiving, from the target RAN node, the MBS service via the second bearer based on the configuration information, herein, before receiving the configuration information: a handover request message comprising information for the first bearer is transmitted from the source RAN node to the target RAN node; and a handover response message comprising i) information informing a change of the first bearer to the second bearer, and ii) the configuration information for the communication on the second bearer is transmitted from the target RAN node to the source RAN node, in response to the handover request message.

According to various embodiments, a wireless device in a wireless communication system comprises: a transceiver; a memory; and at least one processor operatively coupled to the transceiver and the memory, and configured to: control the transceiver to receive, from a source radio access network (RAN) node, a multicast-broadcast service (MBS) service via a first bearer; performing a mobility from the source RAN node to a target RAN node; control the transceiver to receive, from the target RAN node, configuration information for a communication on a second bearer; and control the transceiver to receive, from the target RAN node, the MBS service via the second bearer based on the configuration information, wherein, before receiving the configuration information: a handover request message comprising information for the first bearer is transmitted from the source RAN node to the target RAN node; and a handover response message comprising i) information informing a change of the first bearer to the second bearer, and ii) the configuration information for the communication on the second bearer is transmitted from the target RAN node to the source RAN node, in response to the handover request message.

The present disclosure may have various advantageous effects.

For example, the target RAN node may determine whether to use unicast bearer or MBS bearer if/when a UE is handed over to the target RAN node based on information from source RAN node, current resource situation and/or MBS service availability at the target RAN node. Therefore, service continuity may be satisfied during the mobility procedure and the target RAN node may utilize radio resources more efficiently.

Advantageous effects which can be obtained through specific embodiments of the present disclosure are not limited to the advantageous effects listed above. For example, there may be a variety of technical effects that a person having ordinary skill in the related art can understand and/or derive from the present disclosure. Accordingly, the specific effects of the present disclosure are not limited to those explicitly described herein, but may include various effects that may be understood or derived from the technical features of the present disclosure.

DETAILED DESCRIPTION

Figure 1:
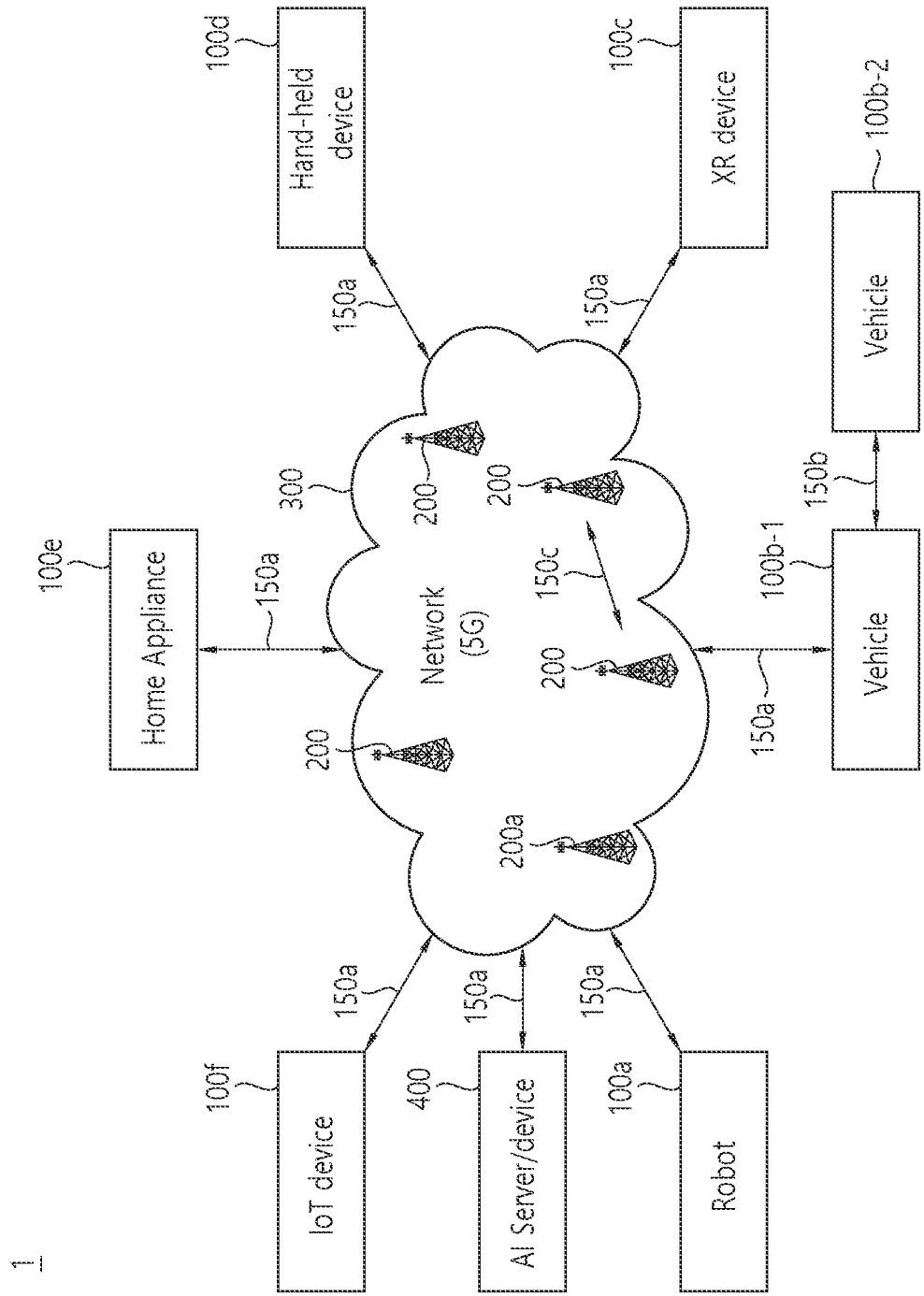
FIG. 1 shows an example of a communication system to which implementations of the present disclosure is applied.

The following techniques, apparatuses, and systems may be applied to a variety of wireless multiple access systems. Examples of the multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multicarrier frequency division multiple access (MC-FDMA) system. CDMA may be embodied through radio technology such as universal terrestrial radio access (UTRA) or CDMA2000. TDMA may be embodied through radio technology such as global system for mobile communications (GSM), general packet radio service (GPRS), or enhanced data rates for GSM evolution (EDGE). OFDMA may be embodied through radio technology such as institute of electrical and electronics engineers (IEEE) 802.11 (Wi-Fi), IEEE 802.16 (WiMAX), IEEE 802.20, or evolved UTRA (E-UTRA). UTRA is a part of a universal mobile telecommunications system (UMTS). 3rd generation partnership project (3GPP) long term evolution (LTE) is a part of evolved UMTS (E-UMTS) using E-UTRA. 3GPP LTE employs OFDMA in DL and SC-FDMA in UL. Evolution of 3GPP LTE includes LTE-A (advanced), LTE-A Pro, and/or 5G NR (new radio).

For convenience of description, implementations of the present disclosure are mainly described in regards to a 3GPP based wireless communication system. However, the technical features of the present disclosure are not limited thereto. For example, although the following detailed description is given based on a mobile communication system corresponding to a 3GPP based wireless communication system, aspects of the present disclosure that are not limited to 3GPP based wireless communication system are applicable to other mobile communication systems.

For terms and technologies which are not specifically described among the terms of and technologies employed in the present disclosure, the wireless communication standard documents published before the present disclosure may be referenced.

In the present disclosure, "A or B" may mean "only A", "only B", or "both A and B". In other words, "A or B" in the present disclosure may be interpreted as "A and/or B". For example, "A, B or C" in the present disclosure may mean "only A", "only B", "only C", or "any combination of A, B and C".

In the present disclosure, slash (/) or comma (,) may mean "and/or". For example, "A/B" may mean "A and/or B". Accordingly, "A/B" may mean "only A", "only B", or "both A and B". For example, "A, B, C" may mean "A, B or C".

In the present disclosure, "at least one of A and B" may mean "only A", "only B" or "both A and B". In addition, the expression "at least one of A or B" or "at least one of A and/or B" in the present disclosure may be interpreted as same as "at least one of A and B".

In addition, in the present disclosure, "at least one of A. B and C" may mean "only A", "only B", "only C", or "any combination of A, B and C". In addition, "at least one of A, B or C" or "at least one of A, B and/or C" may mean "at least one of A, B and C".

Also, parentheses used in the present disclosure may mean "for example". In detail, when it is shown as "control information (PDCCH)", "PDCCH" may be proposed as an example of "control information". In other words, "control information" in the present disclosure is not limited to "PDCCH", and "PDDCH" may be proposed as an example of "control information". In addition, even when shown as "control information (i.e., PDCCH)", "PDCCH" may be proposed as an example of "control information".

Technical features that are separately described in one drawing in the present disclosure may be implemented separately or simultaneously.

Although not limited thereto, various descriptions, functions, procedures, suggestions, methods and/or operational flowcharts of the present disclosure disclosed herein can be applied to various fields requiring wireless communication and/or connection (e.g., 5G) between devices.

Hereinafter, the present disclosure will be described in more detail with reference to drawings. The same reference numerals in the following drawings and/or descriptions may refer to the same and/or corresponding hardware blocks, software blocks, and/or functional blocks unless otherwise indicated.

FIG. 1 shows an example of a communication system to which implementations of the present disclosure is applied.

The 5G usage scenarios shown in FIG. 1 are only exemplary, and the technical features of the present disclosure can be applied to other 5G usage scenarios which are not shown in FIG. 1.

Three main requirement categories for 5G include (1) a category of enhanced mobile broadband (eMBB), (2) a category of massive machine type communication (mMTC), and (3) a category of ultra-reliable and low latency communications (URLLC).

Partial use cases may require a plurality of categories for optimization and other use cases may focus only upon one key performance indicator (KPI). 5G supports such various use cases using a flexible and reliable method.

eMBB far surpasses basic mobile Internet access and covers abundant bidirectional work and media and entertainment applications in cloud and augmented reality. Data is one of 5G core motive forces and, in a 5G era, a dedicated voice service may not be provided for the first time. In 5G, it is expected that voice will be simply processed as an application program using data connection provided by a communication system. Main causes for increased traffic volume are due to an increase in the size of content and an increase in the number of applications requiring high data transmission rate. A streaming service (of audio and video), conversational video, and mobile Internet access will be more widely used as more devices are connected to the Internet. These many application programs require connectivity of an always turned-on state in order to push real-time information and alarm for users. Cloud storage and applications are rapidly increasing in a mobile communication platform and may be applied to both work and entertainment. The cloud storage is a special use case which accelerates growth of uplink data transmission rate. 5G is also used for remote work of cloud. When a tactile interface is used, 5G demands much lower end-to-end latency to maintain user good experience. Entertainment, for example, cloud gaming and video streaming, is another core element which increases demand for mobile broadband capability. Entertainment is essential for a smartphone and a tablet in any place including high mobility environments such as a train, a vehicle, and an airplane. Other use cases are augmented reality for entertainment and information search. In this case, the augmented reality requires very low latency and instantaneous data volume.

In addition, one of the most expected 5G use cases relates a function capable of smoothly connecting embedded sensors in all fields, i.e., mMTC. It is expected that the number of potential Internet-of-things (IoT) devices will reach 204 hundred million up to the year of 2020. An industrial IoT is one of categories of performing a main role enabling a smart city, asset tracking, smart utility, agriculture, and security infrastructure through 5G.

URLLC includes a new service that will change industry through remote control of main infrastructure and an ultra-reliable/available low-latency link such as a self-driving vehicle. A level of reliability and latency is essential to control a smart grid, automatize industry, achieve robotics, and control and adjust a drone.

5G is a means of providing streaming evaluated as a few hundred megabits per second to gigabits per second and may complement fiber-to-the-home (FTTH) and cable-based broadband (or DOCSIS). Such fast speed is needed to deliver TV in resolution of 4K or more (6K, 8K, and more), as well as virtual reality and augmented reality. Virtual reality (VR) and augmented reality (AR) applications include almost immersive sports games. A specific application program may require a special network configuration. For example, for VR games, gaming companies need to incorporate a core server into an edge network server of a network operator in order to minimize latency.

Automotive is expected to be a new important motivated force in 5G together with many use cases for mobile communication for vehicles. For example, entertainment for passengers requires high simultaneous capacity and mobile broadband with high mobility. This is because future users continue to expect connection of high quality regardless of their locations and speeds. Another use case of an automotive field is an AR dashboard. The AR dashboard causes a driver to identify an object in the dark in addition to an object seen from a front window and displays a distance from the object and a movement of the object by overlapping information talking to the driver. In the future, a wireless module enables communication between vehicles, information exchange between a vehicle and supporting infrastructure, and information exchange between a vehicle and other connected devices (e.g., devices accompanied by a pedestrian). A safety system guides alternative courses of a behavior so that a driver may drive more safely drive, thereby lowering the danger of an accident. The next stage will be a remotely controlled or self-driven vehicle. This requires very high reliability and very fast communication between different self-driven vehicles and between a vehicle and infrastructure. In the future, a self-driven vehicle will perform all driving activities and a driver will focus only upon abnormal traffic that the vehicle cannot identify. Technical requirements of a self-driven vehicle demand ultra-low latency and ultra-high reliability so that traffic safety is increased to a level that cannot be achieved by human being.

A smart city and a smart home/building mentioned as a smart society will be embedded in a high-density wireless sensor network. A distributed network of an intelligent sensor will identify conditions for costs and energy-efficient maintenance of a city or a home. Similar configurations may be performed for respective households. All of temperature sensors, window and heating controllers, burglar alarms, and home appliances are wirelessly connected. Many of these sensors are typically low in data transmission rate, power, and cost. However, real-time HD video may be demanded by a specific type of device to perform monitoring.

Consumption and distribution of energy including heat or gas is distributed at a higher level so that automated control of the distribution sensor network is demanded. The smart grid collects information and connects the sensors to each other using digital information and communication technology so as to act according to the collected information. Since this information may include behaviors of a supply company and a consumer, the smart grid may improve distribution of fuels such as electricity by a method having efficiency, reliability, economic feasibility, production sustainability, and automation. The smart grid may also be regarded as another sensor network having low latency.

Mission critical application (e.g., e-health) is one of 5G use scenarios. A health part contains many application programs capable of enjoying benefit of mobile communication. A communication system may support remote treatment that provides clinical treatment in a faraway place. Remote treatment may aid in reducing a barrier against distance and improve access to medical services that cannot be continuously available in a faraway rural area. Remote treatment is also used to perform important treatment and save lives in an emergency situation. The wireless sensor network based on mobile communication may provide remote monitoring and sensors for parameters such as heart rate and blood pressure.

Wireless and mobile communication gradually becomes important in the field of an industrial application. Wiring is high in installation and maintenance cost. Therefore, a possibility of replacing a cable with reconstructible wireless links is an attractive opportunity in many industrial fields. However, in order to achieve this replacement, it is necessary for wireless connection to be established with latency, reliability, and capacity similar to those of the cable and management of wireless connection needs to be simplified. Low latency and a very low error probability are new requirements when connection to 5G is needed.

Logistics and freight tracking are important use cases for mobile communication that enables inventory and package tracking anywhere using a location-based information system. The use cases of logistics and freight typically demand low data rate but require location information with a wide range and reliability.

Referring to FIG. 1, the communication system 1 includes wireless devices 100a to 100f, base stations (BSs) 200, and a network 300. Although FIG. 1 illustrates a 5G network as an example of the network of the communication system 1, the implementations of the present disclosure are not limited to the 5G system, and can be applied to the future communication system beyond the 5G system.

The BSs 200 and the network 300 may be implemented as wireless devices and a specific wireless device may operate as a BS/network node with respect to other wireless devices.

The wireless devices 100a to 100f represent devices performing communication using radio access technology (RAT) (e.g., 5G new RAT (NR)) or LTE) and may be referred to as communication/radio/5G devices. The wireless devices 100a to 100f may include, without being limited to, a robot 100a, vehicles 100b-1 and 100b-2, an extended reality (XR) device 100c, a hand-held device 100d, a home appliance 100e, an IoT device 100f, and an artificial intelligence (AI) device/server 400. For example, the vehicles may include a vehicle having a wireless communication function, an autonomous driving vehicle, and a vehicle capable of performing communication between vehicles. The vehicles may include an unmanned aerial vehicle (UAV) (e.g., a drone). The XR device may include an AR/VR/Mixed Reality (MR) device and may be implemented in the form of a head-mounted device (HMD), a head-up display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter.

In the present disclosure, the wireless devices 100a to 100f may be called user equipments (UEs). A UE may include, for example, a cellular phone, a smartphone, a laptop computer, a digital broadcast terminal, a personal digital assistant (PDA), a portable multimedia player (PMP), a navigation system, a slate personal computer (PC), a tablet PC, an ultrabook, a vehicle, a vehicle having an autonomous traveling function, a connected car, an UAV, an AI module, a robot, an AR device, a VR device, an MR device, a hologram device, a public safety device, an MTC device, an IoT device, a medical device, a FinTech device (or a financial device), a security device, a weather/environment device, a device related to a 5G service, or a device related to a fourth industrial revolution field.

The UAV may be, for example, an aircraft aviated by a wireless control signal without a human being onboard.

The VR device may include, for example, a device for implementing an object or a background of the virtual world. The AR device may include, for example, a device implemented by connecting an object or a background of the virtual world to an object or a background of the real world. The MR device may include, for example, a device implemented by merging an object or a background of the virtual world into an object or a background of the real world. The hologram device may include, for example, a device for implementing a stereoscopic image of 360 degrees by recording and reproducing stereoscopic information, using an interference phenomenon of light generated when two laser lights called holography meet.

The public safety device may include, for example, an image relay device or an image device that is wearable on the body of a user.

The MTC device and the IoT device may be, for example, devices that do not require direct human intervention or manipulation. For example, the MTC device and the IoT device may include smartmeters, vending machines, thermometers, smartbulbs, door locks, or various sensors.

The medical device may be, for example, a device used for the purpose of diagnosing, treating, relieving, curing, or preventing disease. For example, the medical device may be a device used for the purpose of diagnosing, treating, relieving, or correcting injury or impairment. For example, the medical device may be a device used for the purpose of inspecting, replacing, or modifying a structure or a function. For example, the medical device may be a device used for the purpose of adjusting pregnancy. For example, the medical device may include a device for treatment, a device for operation, a device for (in vitro) diagnosis, a hearing aid, or a device for procedure.

The security device may be, for example, a device installed to prevent a danger that may arise and to maintain safety. For example, the security device may be a camera, a closed-circuit TV (CCTV), a recorder, or a black box.

The FinTech device may be, for example, a device capable of providing a financial service such as mobile payment. For example, the FinTech device may include a payment device or a point of sales (POS) system.

The weather/environment device may include, for example, a device for monitoring or predicting a weather/environment.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, a 5G (e.g., NR) network, and a beyond-5G network. Although the wireless devices 100a to 100f may communicate with each other through the BSs 200/network 300, the wireless devices 100a to 100f may perform direct communication (e.g., sidelink communication) with each other without passing through the BSs 200/network 300. For example, the vehicles 100b-1 and 100b-2 may perform direct communication (e.g., vehicle-to-vehicle (V2V)/vehicle-to-everything (V2X) communication). The IoT device (e.g., a sensor) may perform direct communication with other IoT devices (e.g., sensors) or other wireless devices 100a to 100f.

Wireless communication/connections 150a, 150b and 150c may be established between the wireless devices 100a to 100f and/or between wireless device 100a to 100f and BS 200 and/or between BSs 200. Herein, the wireless communication/connections may be established through various RATs (e.g., 5G NR) such as uplink/downlink communication 150a, sidelink communication (or device-to-device (D2D) communication) 150b, inter-base station communication 150c (e.g., relay, integrated access and backhaul (IAB)), etc. The wireless devices 100a to 100f and the BSs 200/the wireless devices 100a to 100f may transmit/receive radio signals to/from each other through the wireless communication/connections 150a, 150b and 150c. For example, the wireless communication/connections 150a, 150b and 150c may transmit/receive signals through various physical channels. To this end, at least a part of various configuration information configuring processes, various signal processing processes (e.g., channel encoding/decoding, modulation/demodulation, and resource mapping/de-mapping), and resource allocating processes, for transmitting/receiving radio signals, may be performed based on the various proposals of the present disclosure.

AI refers to the field of studying artificial intelligence or the methodology that can create it, and machine learning refers to the field of defining various problems addressed in the field of AI and the field of methodology to solve them. Machine learning is also defined as an algorithm that increases the performance of a task through steady experience on a task.

Robot means a machine that automatically processes or operates a given task by its own ability. In particular, robots with the ability to recognize the environment and make self-determination to perform actions can be called intelligent robots. Robots can be classified as industrial, medical, home, military, etc., depending on the purpose or area of use. The robot can perform a variety of physical operations, such as moving the robot joints with actuators or motors. The movable robot also includes wheels, brakes, propellers, etc., on the drive, allowing it to drive on the ground or fly in the air.

Autonomous driving means a technology that drives on its own, and autonomous vehicles mean vehicles that drive without user's control or with minimal user's control. For example, autonomous driving may include maintaining lanes in motion, automatically adjusting speed such as adaptive cruise control, automatic driving along a set route, and automatically setting a route when a destination is set. The vehicle covers vehicles equipped with internal combustion engines, hybrid vehicles equipped with internal combustion engines and electric motors, and electric vehicles equipped with electric motors, and may include trains, motorcycles, etc., as well as cars. Autonomous vehicles can be seen as robots with autonomous driving functions.

Extended reality is collectively referred to as VR, AR, and MR. VR technology provides objects and backgrounds of real world only through computer graphic (CG) images. AR technology provides a virtual CG image on top of a real object image. MR technology is a CG technology that combines and combines virtual objects into the real world. MR technology is similar to AR technology in that they show real and virtual objects together. However, there is a difference in that in AR technology, virtual objects are used as complementary forms to real objects, while in MR technology, virtual objects and real objects are used as equal personalities.

NR supports multiples numerologies (and/or multiple subcarrier spacings (SCS)) to support various 5G services. For example, if SCS is 15 kHz, wide area can be supported in traditional cellular bands, and if SCS is 30 kHz/60 kHz, dense-urban, lower latency, and wider carrier bandwidth can be supported. If SCS is 60 kHz or higher, bandwidths greater than 24.25 GHz can be supported to overcome phase noise.

The NR frequency band may be defined as two types of frequency range, i.e., FR1 and FR2. The numerical value of the frequency range may be changed. For example, the frequency ranges of the two types (FR1 and FR2) may be as shown in Table 1 below. For ease of explanation, in the frequency ranges used in the NR system, FR1 may mean "sub 6 GHz range", FR2 may mean "above 6 GHz range," and may be referred to as millimeter wave (mmW).

TABLE 1

| Frequency Range designation | Corresponding frequency range | Subcarrier Spacing |
| --- | --- | --- |
| FR1 | 450 MHz-6000 MHz | 15, 30, 60 kHz |
| FR2 | 24250 MHz-52600 MHz | 60, 120, 240 kHz |

As mentioned above, the numerical value of the frequency range of the NR system may be changed. For example, FR1 may include a frequency band of 410 MHz to 7125 MHz as shown in Table 2 below. That is, FR1 may include a frequency band of 6 GHz (or 5850, 5900, 5925 MHz, etc.) or more. For example, a frequency band of 6 GHz (or 5850, 5900, 5925 MHz, etc.) or more included in FR1 may include an unlicensed band. Unlicensed bands may be used for a variety of purposes, for example for communication for vehicles (e.g., autonomous driving).

TABLE 2

| Frequency Range designation | Corresponding frequency range | Subcarrier Spacing |
| --- | --- | --- |
| FR1 | 410 MHz-7125 MHz | 15, 30, 60 kHz |
| FR2 | 24250 MHz-52600 MHz | 60, 120, 240 kHz |

Figure 2:
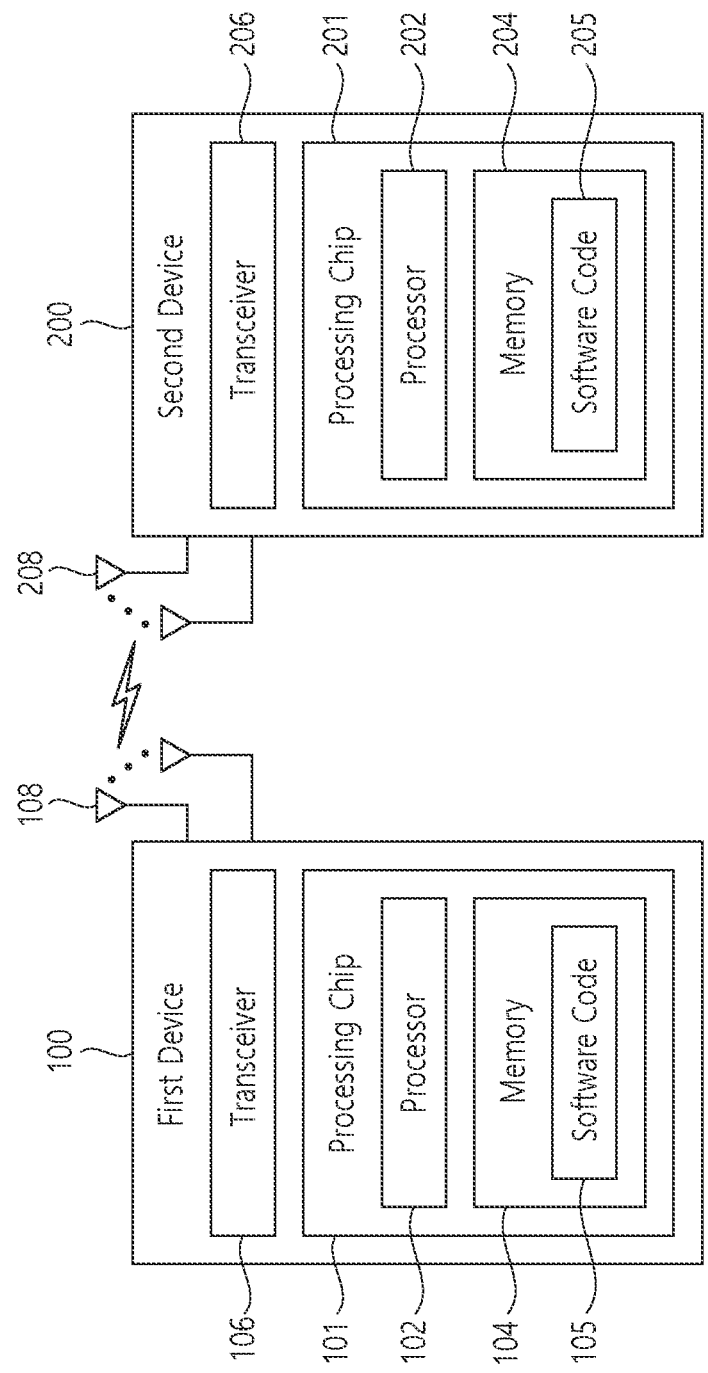
FIG. 2 shows an example of wireless devices to which implementations of the present disclosure is applied.

Here, the radio communication technologies implemented in the wireless devices in the present disclosure may include narrowband internet-of-things (NB-IoT) technology for low-power communication as well as LTE, NR and 6G. For example, NB-IoT technology may be an example of low power wide area network (LPWAN) technology, may be implemented in specifications such as LTE Cat NB1 and/or LTE Cat NB2, and may not be limited to the above-mentioned names. Additionally and/or alternatively, the radio communication technologies implemented in the wireless devices in the present disclosure may communicate based on LTE-M technology. For example, LTE-M technology may be an example of LPWAN technology and be called by various names such as enhanced machine type communication (eMTC). For example, LTE-M technology may be implemented in at least one of the various specifications, such as 1) LTE Cat 0, 2) LTE Cat M1, 3) LTE Cat M2, 4) LTE non-bandwidth limited (non-BL), 5) LTE-MTC, 6) LTE Machine Type Communication, and/or 7) LTE M, and may not be limited to the above-mentioned names. Additionally and/or alternatively, the radio communication technologies implemented in the wireless devices in the present disclosure may include at least one of ZigBee, Bluetooth, and/or LPWAN which take into account low-power communication, and may not be limited to the above-mentioned names. For example, ZigBee technology may generate personal area networks (PANs) associated with small/low-power digital communication based on various specifications such as IEEE 802.15.4 and may be called various names. FIG. 2 shows an example of wireless devices to which implementations of the present disclosure is applied.

Referring to FIG. 2, a first wireless device 100 and a second wireless device 200 may transmit/receive radio signals to/from an external device through a variety of RATs (e.g., LTE and NR).

In FIG. 2, {the first wireless device 100 and the second wireless device 200} may correspond to at least one of {the wireless device 100a to 100f and the BS 200}, {the wireless device 100a to 100f and the wireless device 100a to 100f} and/or {the BS 200 and the BS 200} of FIG. 1.

The first wireless device 100 may include at least one transceiver, such as a transceiver 106, at least one processing chip, such as a processing chip 101, and/or one or more antennas 108.

The processing chip 101 may include at least one processor, such a processor 102, and at least one memory, such as a memory 104. It is exemplarily shown in FIG. 2 that the memory 104 is included in the processing chip 101. Additional and/or alternatively, the memory 104 may be placed outside of the processing chip 101.

The processor 102 may control the memory 104 and/or the transceiver 106 and may be configured to implement the descriptions, functions, procedures, suggestions, methods and/or operational flowcharts described in the present disclosure. For example, the processor 102 may process information within the memory 104 to generate first information/signals and then transmit radio signals including the first information/signals through the transceiver 106. The processor 102 may receive radio signals including second information/signals through the transceiver 106 and then store information obtained by processing the second information/signals in the memory 104.

The memory 104 may be operably connectable to the processor 102. The memory 104 may store various types of information and/or instructions. The memory 104 may store a software code 105 which implements instructions that, w % ben executed by the processor 102, perform the descriptions, functions, procedures, suggestions, methods and/or operational flowcharts disclosed in the present disclosure. For example, the software code 105 may implement instructions that, when executed by the processor 102, perform the descriptions, functions, procedures, suggestions, methods and/or operational flowcharts disclosed in the present disclosure. For example, the software code 105 may control the processor 102 to perform one or more protocols. For example, the software code 105 may control the processor 102 to perform one or more layers of the radio interface protocol.

Herein, the processor 102 and the memory 104 may be a part of a communication modem/circuit/chip designed to implement RAT (e.g., LTE or NR). The transceiver 106 may be connected to the processor 102 and transmit and/or receive radio signals through one or more antennas 108. Each of the transceiver 106 may include a transmitter and/or a receiver. The transceiver 106 may be interchangeably used with radio frequency (RF) unit(s). In the present disclosure, the first wireless device 100 may represent a communication modem/circuit/chip.

The second wireless device 200 may include at least one transceiver, such as a transceiver 206, at least one processing chip, such as a processing chip 201, and/or one or more antennas 208.

The processing chip 201 may include at least one processor, such a processor 202, and at least one memory, such as a memory 204. It is exemplarily shown in FIG. 2 that the memory 204 is included in the processing chip 201. Additional and/or alternatively, the memory 204 may be placed outside of the processing chip 201.

The processor 202 may control the memory 204 and/or the transceiver 206 and may be configured to implement the descriptions, functions, procedures, suggestions, methods and/or operational flowcharts described in the present disclosure. For example, the processor 202 may process information within the memory 204 to generate third information/signals and then transmit radio signals including the third information/signals through the transceiver 206. The processor 202 may receive radio signals including fourth information/signals through the transceiver 106 and then store information obtained by processing the fourth information/signals in the memory 204.

The memory 204 may be operably connectable to the processor 202. The memory 204 may store various types of information and/or instructions. The memory 204 may store a software code 205 which implements instructions that, when executed by the processor 202, perform the descriptions, functions, procedures, suggestions, methods and/or operational flowcharts disclosed in the present disclosure. For example, the software code 205 may implement instructions that, when executed by the processor 202, perform the descriptions, functions, procedures, suggestions, methods and/or operational flowcharts disclosed in the present disclosure. For example, the software code 205 may control the processor 202 to perform one or more protocols. For example, the software code 205 may control the processor 202 to perform one or more layers of the radio interface protocol.

Herein, the processor 202 and the memory 204 may be a part of a communication modem/circuit/chip designed to implement RAT (e.g., LTE or NR). The transceiver 206 may be connected to the processor 202 and transmit and/or receive radio signals through one or more antennas 208. Each of the transceiver 206 may include a transmitter and/or a receiver. The transceiver 206 may be interchangeably used with RF unit. In the present disclosure, the second wireless device 200 may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as physical (PHY) layer, media access control (MAC) layer, radio link control (RLC) layer, packet data convergence protocol (PDCP) layer, radio resource control (RRC) layer, and service data adaptation protocol (SDAP) layer). The one or more processors 102 and 202 may generate one or more protocol data units (PDUs) and/or one or more service data unit (SDUs) according to the descriptions, functions, procedures, suggestions, methods and/or operational flowcharts disclosed in the present disclosure. The one or more processors 102 and 202 may generate messages, control information, data, or information according to the descriptions, functions, procedures, suggestions, methods and/or operational flowcharts disclosed in the present disclosure. The one or more processors 102 and 202 may generate signals (e.g., baseband signals) including PDUs, SDUs, messages, control information, data, or information according to the descriptions, functions, procedures, suggestions, methods and/or operational flowcharts disclosed in the present disclosure and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, suggestions, methods and/or operational flowcharts disclosed in the present disclosure.

The one or more processors 102 and 202 may be referred to as controllers, microcontrollers, microprocessors, or microcomputers. The one or more processors 102 and 202 may be implemented by hardware, firmware, software, or a combination thereof. As an example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 102 and 202. The descriptions, functions, procedures, suggestions, methods and/or operational flowcharts disclosed in the present disclosure may be implemented using firmware or software and the firmware or software may be configured to include the modules, procedures, or functions. Firmware or software configured to perform the descriptions, functions, procedures, suggestions, methods and/or operational flowcharts disclosed in the present disclosure may be included in the one or more processors 102 and 202 or stored in the one or more memories 104 and 204 so as to be driven by the one or more processors 102 and 202. The descriptions, functions, procedures, suggestions, methods and/or operational flowcharts disclosed in the present disclosure may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by read-only memories (ROMs), random access memories (RAMs), electrically erasable programmable read-only memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the descriptions, functions, procedures, suggestions, methods and/or operational flowcharts disclosed in the present disclosure, to one or more other devices. The one or more transceivers 106 and 206 may receive user data, control information, and/or radio signals/channels, mentioned in the descriptions, functions, procedures, suggestions, methods and/or operational flowcharts disclosed in the present disclosure, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices.

The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, suggestions, methods and/or operational flowcharts disclosed in the present disclosure, through the one or more antennas 108 and 208. In the present disclosure, the one or more antennas 108 and 208 may be a plurality of physical antennas or a plurality of logical antennas (e.g., antenna ports).

The one or more transceivers 106 and 206 may convert received user data, control information, radio signals/channels, etc., from RF band signals into baseband signals in order to process received user data, control information, radio signals/channels, etc., using the one or more processors 102 and 202. The one or more transceivers 106 and 206 may convert the user data, control information, radio signals/channels, etc., processed using the one or more processors 102 and 202 from the base band signals into the RF band signals. To this end, the one or more transceivers 106 and 206 may include (analog) oscillators and/or filters. For example, the one or more transceivers 106 and 206 can up-convert OFDM baseband signals to OFDM signals by their (analog) oscillators and/or filters under the control of the one or more processors 102 and 202 and transmit the up-converted OFDM signals at the carrier frequency. The one or more transceivers 106 and 206 may receive OFDM signals at a carrier frequency and down-convert the OFDM signals into OFDM baseband signals by their (analog) oscillators and/or filters under the control of the one or more processors 102 and 202.

In the implementations of the present disclosure, a UE may operate as a transmitting device in uplink (UL) and as a receiving device in downlink (DL). In the implementations of the present disclosure, a BS may operate as a receiving device in UL and as a transmitting device in DL. Hereinafter, for convenience of description, it is mainly assumed that the first wireless device 100 acts as the UE, and the second wireless device 200 acts as the BS. For example, the processor(s) 102 connected to, mounted on or launched in the first wireless device 100 may be configured to perform the UE behavior according to an implementation of the present disclosure or control the transceiver(s) 106 to perform the UE behavior according to an implementation of the present disclosure. The processor(s) 202 connected to, mounted on or launched in the second wireless device 200 may be configured to perform the BS behavior according to an implementation of the present disclosure or control the transceiver(s) 206 to perform the BS behavior according to an implementation of the present disclosure.

In the present disclosure, a BS is also referred to as a node B (NB), an eNode B (eNB), or a gNB.

Figure 3:
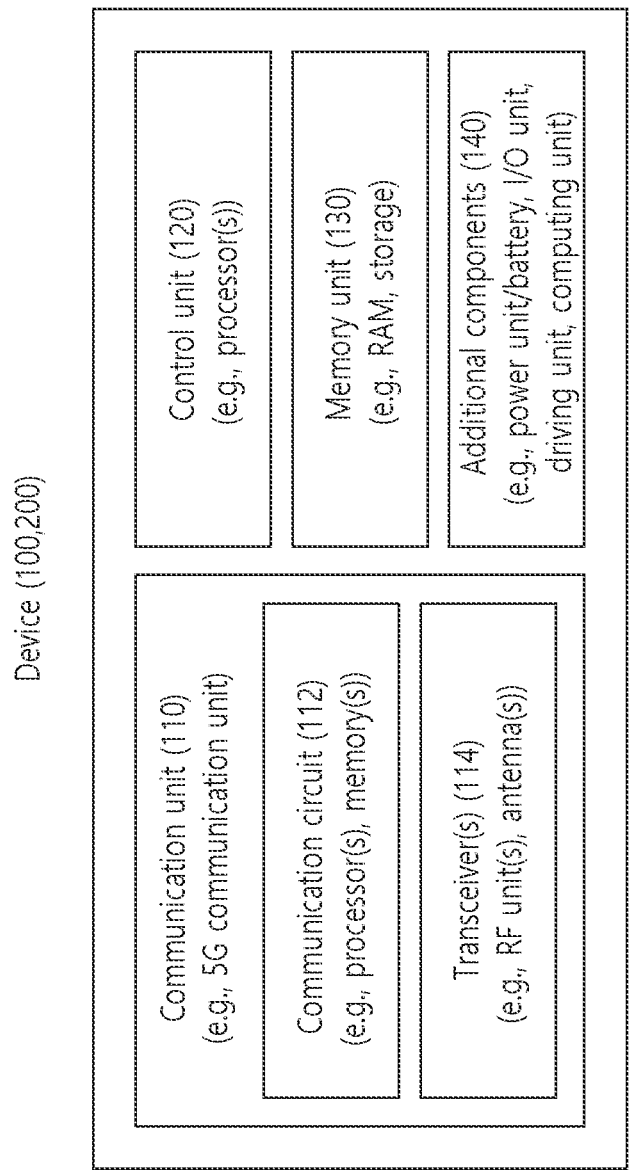
FIG. 3 shows an example of a wireless device to which implementations of the present disclosure is applied.

FIG. 3 shows an example of a wireless device to which implementations of the present disclosure is applied.

The wireless device may be implemented in various forms according to a use-case/service (refer to FIG. 1).

Referring to FIG. 3, wireless devices 100 and 200 may correspond to the wireless devices 100 and 200 of FIG. 2 and may be configured by various elements, components, units/portions, and/or modules. For example, each of the wireless devices 100 and 200 may include a communication unit 110, a control unit 120, a memory unit 130, and additional components 140. The communication unit 110 may include a communication circuit 112 and transceiver(s) 114. For example, the communication circuit 112 may include the one or more processors 102 and 202 of FIG. 2 and/or the one or more memories 104 and 204 of FIG. 2. For example, the transceiver(s) 114 may include the one or more transceivers 106 and 206 of FIG. 2 and/or the one or more antennas 108 and 208 of FIG. 2. The control unit 120 is electrically connected to the communication unit 110, the memory unit 130, and the additional components 140 and controls overall operation of each of the wireless devices 100 and 200. For example, the control unit 120 may control an electric/mechanical operation of each of the wireless devices 100 and 200 based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of the wireless devices 100 and 200. For example, the additional components 140 may include at least one of a power unit/battery, input/output (I/O) unit (e.g., audio I/O port, video I/O port), a driving unit, and a computing unit. The wireless devices 100 and 200 may be implemented in the form of, without being limited to, the robot (100*a* of FIG. 1), the vehicles (100*b*-1 and 100*b*-2 of FIG. 1), the XR device (100*c* of FIG. 1), the hand-held device (100*d* of FIG. 1), the home appliance (100*e* of FIG. 1), the IoT device (100*f* of FIG. 1), a digital broadcast terminal, a hologram device, a public safety device, an MTC device, a medicine device, a FinTech device (or a finance device), a security device, a climate/environment device, the AI server/device (400 of FIG. 1), the BSs (200 of FIG. 1), a network node, etc. The wireless devices 100 and 200 may be used in a mobile or fixed place according to a use-example/service.

In FIG. 3, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor (AP), an electronic control unit (ECU), a graphical processing unit, and a memory control processor. As another example, the memory unit 130 may be configured by a RAM, a DRAM, a ROM, a flash memory, a volatile memory, a non-volatile memory, and/or a combination thereof.

Figure 4:
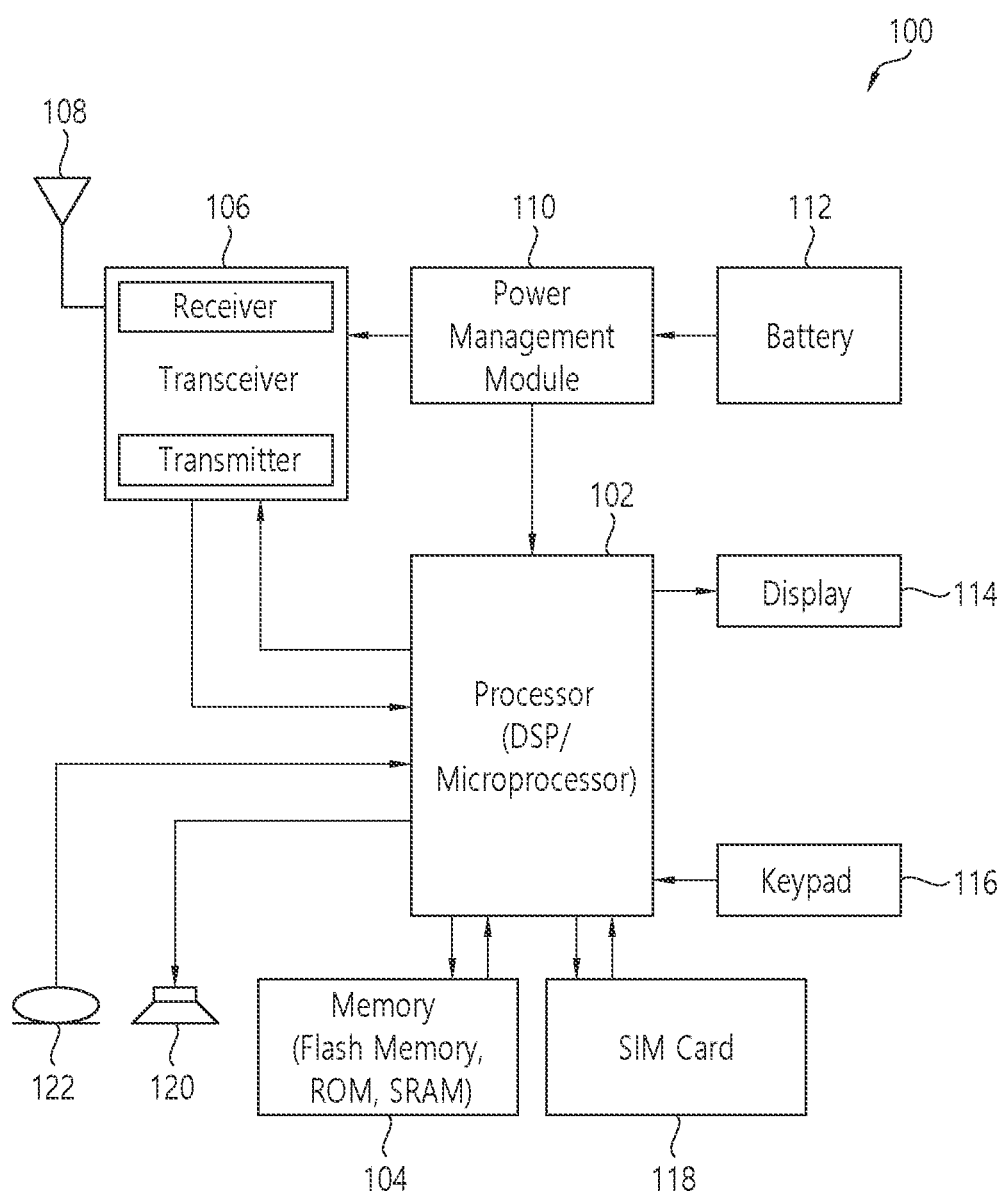
FIG. 4 shows an example of UE to which implementations of the present disclosure is applied.

FIG. 4 shows an example of UE to which implementations of the present disclosure is applied.

Referring to FIG. 4, a UE 100 may correspond to the first wireless device 100 of FIG. 2 and/or the wireless device 100 or 200 of FIG. 3.

A UE 100 includes a processor 102, a memory 104, a transceiver 106, one or more antennas 108, a power management module 110, a battery 112, a display 114, a keypad 116, a subscriber identification module (SIM) card 118, a speaker 120, and a microphone 122.

The processor 102 may be configured to implement the descriptions, functions, procedures, suggestions, methods and/or operational flowcharts disclosed in the present disclosure. The processor 102 may be configured to control one or more other components of the UE 100 to implement the descriptions, functions, procedures, suggestions, methods and/or operational flowcharts disclosed in the present disclosure. Layers of the radio interface protocol may be implemented in the processor 102. The processor 102 may include ASIC, other chipset, logic circuit and/or data processing device. The processor 102 may be an application processor. The processor 102 may include at least one of a digital signal processor (DSP), a central processing unit (CPU), a graphics processing unit (GPU), a modem (modulator and demodulator). An example of the processor 102 may be found in SNAPDRAGON™ series of processors made by Qualcomm®, EXYNOS™ series of processors made by Samsung®, A series of processors made by Apple®, HELIO™ series of processors made by MediaTek®, ATOM™ series of processors made by Intel® or a corresponding next generation processor.

The memory 104 is operatively coupled with the processor 102 and stores a variety of information to operate the processor 102. The memory 104 may include ROM, RAM, flash memory, memory card, storage medium and/or other storage device. When the embodiments are implemented in software, the techniques described herein can be implemented with modules (e.g., procedures, functions, etc.) that perform the descriptions, functions, procedures, suggestions, methods and/or operational flowcharts disclosed in the present disclosure. The modules can be stored in the memory 104 and executed by the processor 102. The memory 104 can be implemented within the processor 102 or external to the processor 102 in which case those can be communicatively coupled to the processor 102 via various means as is known in the art.

The transceiver 106 is operatively coupled with the processor 102, and transmits and/or receives a radio signal. The transceiver 106 includes a transmitter and a receiver. The transceiver 106 may include baseband circuitry to process radio frequency signals. The transceiver 106 controls the one or more antennas 108 to transmit and/or receive a radio signal.

The power management module 110 manages power for the processor 102 and/or the transceiver 106. The battery 12 supplies power to the power management module 110.

The display 114 outputs results processed by the processor 102. The keypad 116 receives inputs to be used by the processor 102. The keypad 116 may be shown on the display 114.

The SIM card 118 is an integrated circuit that is intended to securely store the international mobile subscriber identity (IMSI) number and its related key, which are used to identify and authenticate subscribers on mobile telephony devices (such as mobile phones and computers). It is also possible to store contact information on many SIM cards.

The speaker 120 outputs sound-related results processed by the processor 102. The microphone 122 receives sound-related inputs to be used by the processor 102.

Figure 5:
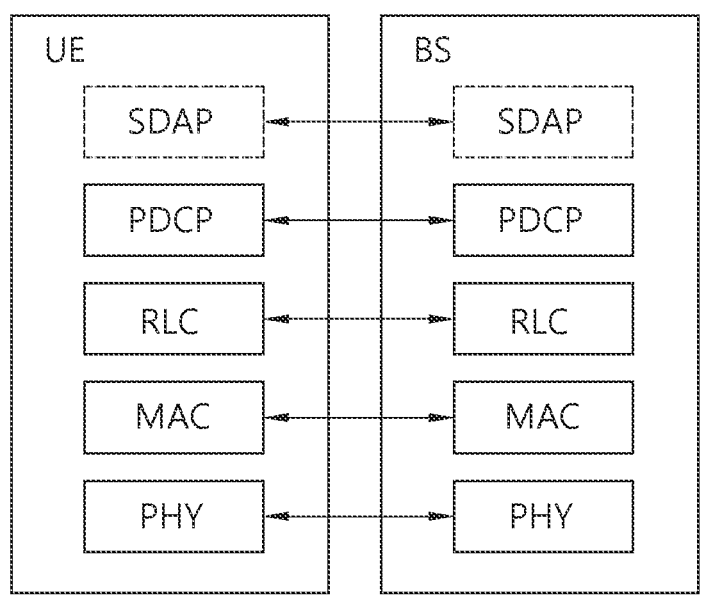
FIGS. 5 and 6 show an example of protocol stacks in a 3GPP based wireless communication system to which implementations of the present disclosure is applied.
Figure 6:
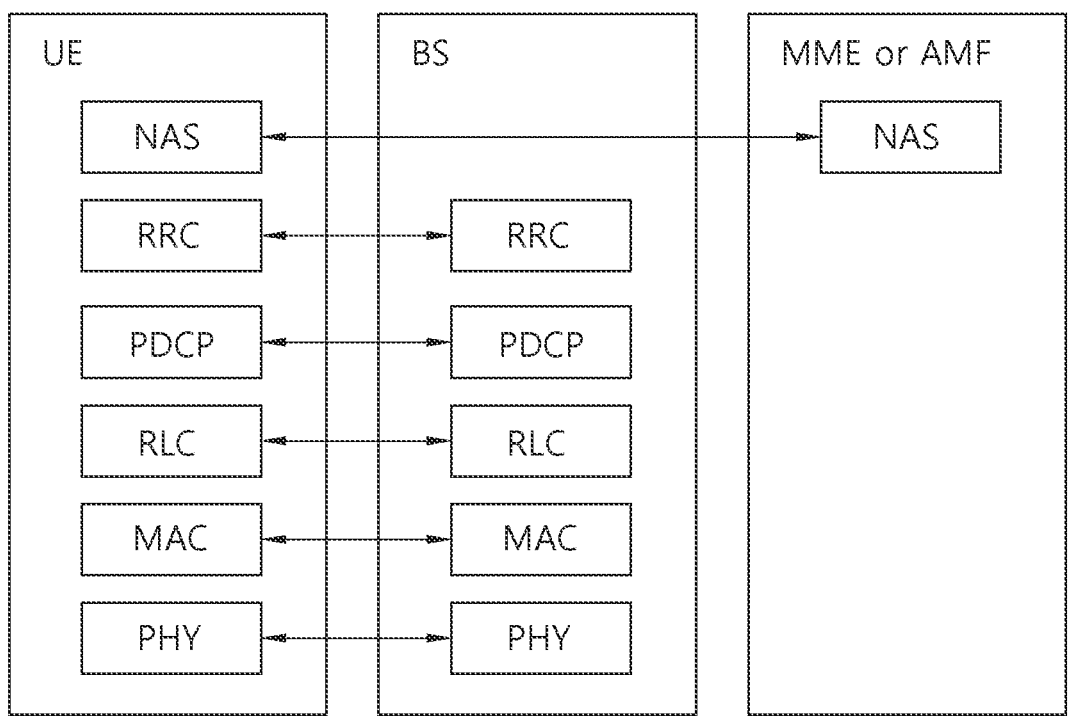

FIGS. 5 and 6 show an example of protocol stacks in a 3GPP based wireless communication system to which implementations of the present disclosure is applied.

In particular, FIG. 5 illustrates an example of a radio interface user plane protocol stack between a UE and a BS and FIG. 6 illustrates an example of a radio interface control plane protocol stack between a UE and a BS. The control plane refers to a path through which control messages used to manage call by a UE and a network are transported. The user plane refers to a path through which data generated in an application layer, for example, voice data or Internet packet data are transported. Referring to FIG. 5, the user plane protocol stack may be divided into Layer 1 (i.e., a PHY layer) and Layer 2. Referring to FIG. 6, the control plane protocol stack may be divided into Layer 1 (i.e., a PHY layer), Layer 2, Layer 3 (e.g., an RRC layer), and a non-access stratum (NAS) layer. Layer 1, Layer 2 and Layer 3 are referred to as an access stratum (AS).

In the 3GPP LTE system, the Layer 2 is split into the following sublayers: MAC, RLC, and PDCP. In the 3GPP NR system, the Layer 2 is split into the following sublayers: MAC, RLC, PDCP and SDAP. The PHY layer offers to the MAC sublayer transport channels, the MAC sublayer offers to the RLC sublayer logical channels, the RLC sublayer offers to the PDCP sublayer RLC channels, the PDCP sublayer offers to the SDAP sublayer radio bearers. The SDAP sublayer offers to 5G core network quality of service (QoS) flows.

In the 3GPP NR system, the main services and functions of the MAC sublayer include: mapping between logical channels and transport channels; multiplexing/de-multiplexing of MAC SDUs belonging to one or different logical channels into/from transport blocks (TB) delivered to/from the physical layer on transport channels; scheduling information reporting; error correction through hybrid automatic repeat request (HARQ) (one HARQ entity per cell in case of carrier aggregation (CA)); priority handling between UEs by means of dynamic scheduling; priority handling between logical channels of one UE by means of logical channel prioritization; padding. A single MAC entity may support multiple numerologies, transmission timings and cells. Mapping restrictions in logical channel prioritization control which numerology(ies), cell(s), and transmission timing(s) a logical channel can use.

Different kinds of data transfer services are offered by MAC. To accommodate different kinds of data transfer services, multiple types of logical channels are defined, i.e., each supporting transfer of a particular type of information. Each logical channel type is defined by what type of information is transferred. Logical channels are classified into two groups: control channels and traffic channels. Control channels are used for the transfer of control plane information only, and traffic channels are used for the transfer of user plane information only. Broadcast control channel (BCCH) is a downlink logical channel for broadcasting system control information, paging control channel (PCCH) is a downlink logical channel that transfers paging information, system information change notifications and indications of ongoing public warning service (PWS) broadcasts, common control channel (CCCH) is a logical channel for transmitting control information between UEs and network and used for UEs having no RRC connection with the network, and dedicated control channel (DCCH) is a point-to-point bi-directional logical channel that transmits dedicated control information between a UE and the network and used by UEs having an RRC connection. Dedicated traffic channel (DTCH) is a point-to-point logical channel, dedicated to one UE, for the transfer of user information. A DTCH can exist in both uplink and downlink. In downlink, the following connections between logical channels and transport channels exist: BCCH can be mapped to broadcast channel (BCH); BCCH can be mapped to downlink shared channel (DL-SCH); PCCH can be mapped to paging channel (PCH); CCCH can be mapped to DL-SCH; DCCH can be mapped to DL-SCH; and DTCH can be mapped to DL-SCH. In uplink, the following connections between logical channels and transport channels exist: CCCH can be mapped to uplink shared channel (UL-SCH); DCCH can be mapped to UL-SCH; and DTCH can be mapped to UL-SCH.

The RLC sublayer supports three transmission modes: transparent mode (TM), unacknowledged mode (UM), and acknowledged node (AM). The RLC configuration is per logical channel with no dependency on numerologies and/or transmission durations. In the 3GPP NR system, the main services and functions of the RLC sublayer depend on the transmission mode and include: transfer of upper layer PDUs; sequence numbering independent of the one in PDCP (UM and AM); error correction through ARQ (AM only); segmentation (AM and UM) and re-segmentation (AM only) of RLC SDUs; reassembly of SDU (AM and UM); duplicate detection (AM only); RLC SDU discard (AM and UM); RLC re-establishment; protocol error detection (AM only).

In the 3GPP NR system, the main services and functions of the PDCP sublayer for the user plane include: sequence numbering; header compression and decompression using robust header compression (ROHC); transfer of user data; reordering and duplicate detection; in-order delivery; PDCP PDU routing (in case of split bearers); retransmission of PDCP SDUs; ciphering, deciphering and integrity protection; PDCP SDU discard; PDCP re-establishment and data recovery for RLC AM; PDCP status reporting for RLC AM; duplication of PDCP PDUs and duplicate discard indication to lower layers. The main services and functions of the PDCP sublayer for the control plane include: sequence numbering; ciphering, deciphering and integrity protection; transfer of control plane data; reordering and duplicate detection; in-order delivery; duplication of PDCP PDUs and duplicate discard indication to lower layers.

In the 3GPP NR system, the main services and functions of SDAP include: mapping between a QoS flow and a data radio bearer; marking QoS flow ID (QFI) in both DL and UL packets. A single protocol entity of SDAP is configured for each individual PDU session.

In the 3GPP NR system, the main services and functions of the RRC sublayer include: broadcast of system information related to AS and NAS; paging initiated by 5GC or NG-RAN; establishment, maintenance and release of an RRC connection between the UE and NG-RAN; security functions including key management, establishment, configuration, maintenance and release of signaling radio bearers (SRBs) and data radio bearers (DRBs); mobility functions (including: handover and context transfer, UE cell selection and reselection and control of cell selection and reselection, inter-RAT mobility); QoS management functions; UE measurement reporting and control of the reporting; detection of and recovery from radio link failure; NAS message transfer to/from NAS from/to UE.

Hereinafter, mobility is described. Mobility refers to a procedure for i) changing a PCell of a UE (i.e., handover or PCell change), ii) changing a PSCell of a UE (i.e., SN change or PSCell change), and/or iii) adding a PSCell for a UE (i.e., SN addition or PSCell addition). Therefore, the mobility may comprise at least one of a handover, an SN change or an SN addition. In other words, the mobility may comprise at least one of PCell change, PSCell change or PSCell addition. Throughout the disclosure, performing a mobility to a target cell may refer to applying a mobility command of the target cell or applying a target cell configuration for the target cell in the mobility command of the target cell. The target cell configuration for the target cell may comprise RRC reconfiguration parameters associated with the mobility to the target cell. Further. RRC reconfiguration and RRC connection reconfiguration may be used interchangeably.

In the disclosure, the target cell configuration may also be referred to as candidate cell configuration. The candidate cell configuration may comprise reconfigurationWithSync, which comprise parameters for the synchronous reconfiguration to the target SpCell. For example, the reconfigurationWithSync may comprise at least one of a new UE-identity (i.e., a kind of RNTI value), timer T304, spCellConfigCommon, rach-ConfigDedicated or smtc. The spCellConfigCommon may comprise ServingCellConfigCommon which is used to configure cell specific parameters of a UE's serving cell. The rach-ConfigDedicated may indicate a random access configuration to be used for a reconfiguration with sync (e.g., mobility). The smtc may indicate a synchronization signal/physical broadcast channel (SS/PBCH) block periodicity/offset/duration configuration of target cell for PSCell change, PCell change and/or PSCell addition. The SS/PBCH block may be simply referred to as synchronization signal block (SSB).

SN mobility refers to a procedure for i) changing a PSCell of a UE (i.e., SN change or PSCell change), and/or ii) adding a PSCell for a UE (i.e., SN addition or PSCell addition). Therefore, the SN mobility may comprise at least one of an SN change or an SN addition. In other words, the SN mobility may comprise at least one of PSCell change or PSCell addition. Throughout the disclosure, performing an SN mobility to a target cell may refer to applying an SN mobility command of the target cell or applying a target cell configuration for the target cell in the SN mobility command of the target cell. The target cell configuration for the target cell may comprise RRC reconfiguration parameters associated with the SN mobility to the target cell. The SN mobility may be a kind of a mobility. The SN mobility command may comprise a SN change command for performing SN change, or SN addition command for performing SN addition.

Figure 7:
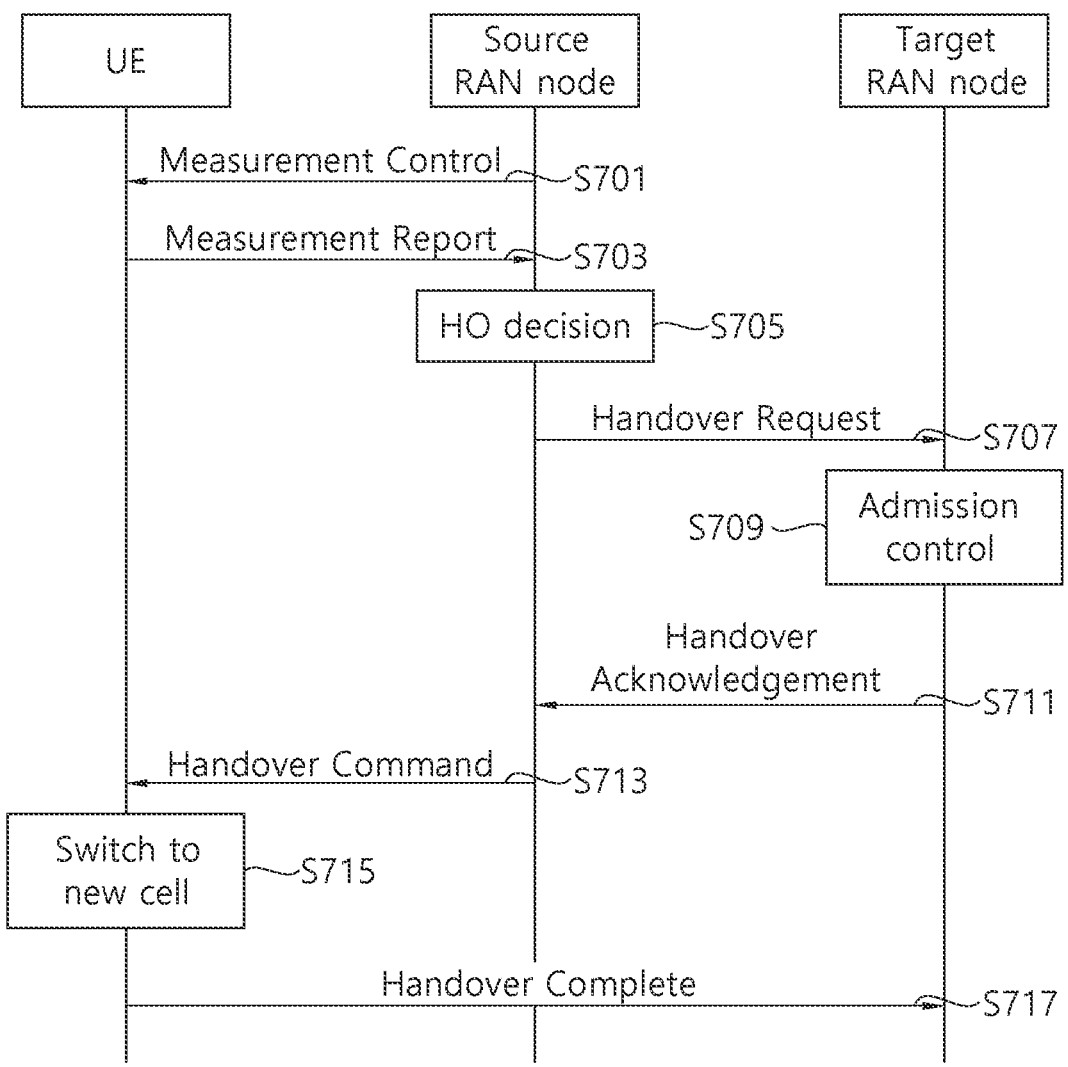
FIG. 7 shows an example of a legacy handover procedure to which technical features of the present disclosure can be applied.

FIG. 7 shows an example of a legacy handover procedure to which technical features of the present disclosure can be applied. FIG. 7 illustrates steps for the handover procedure exemplary, but the illustrated steps can also be applied to a legacy mobility procedure (e.g., SN addition procedure and/or SN change procedure).

Referring to FIG. 7, in step S701, the source RAN node may transmit measurement control message to the UE. The source RAN node may configure the UE measurement procedures according to the roaming and access restriction information and, for example, the available multiple frequency band information through the measurement control message. Measurement control information provided by the source RAN node through the measurement control message may assist the function controlling the UE's connection mobility. For example, the measurement control message may comprise measurement configuration and/or report configuration.

In step S703, the UE may transmit a measurement report message to the source RAN node. The measurement report message may comprise a result of measurement on neighbor cell(s) around the UE which can be detected by the UE. The UE may generate the measurement report message according to a measurement configuration and/or measurement control information in the measurement control message received in step S701.

In step S705, the source RAN node may make a handover (HO) decision based on the measurement report. For example, the source RAN node may make a HO decision and determine a target RAN node for HO among neighbor cells around the UE based on a result of measurement (e.g., cell quality, signal quality, signal strength, reference signal received power (RSRP), reference signal received quality (RSRP), channel state, channel quality, signal to interference plus noise ratio (SINR)) on the neighbor cells.

In step S707, the source RAN node may transmit a HO request message to the target RAN node which is determined in step S705. That is, the source RAN node may perform handover preparation with the target RAN node. The HO request message may comprise necessary information to prepare the handover at the target RAN node.

In step S709, the target RAN node may perform an admission control based on information included in the HO request message. The target RAN node may configure and reserve the required resources (e.g., C-RNTI and/or RACH preamble). The AS-configuration to be used in the target RAN node can either be specified independently (i.e. an "establishment") or as a delta compared to the AS-configuration used in the source RAN node (i.e. a "reconfiguration").

In step S711, the target RAN node may transmit a HO request acknowledge (ACK) message to the source RAN node. The HO request ACK message may comprise information on resources reserved and prepared for a handover. For example, the HO request ACK message may comprise a transparent container to be sent to the UE as an RRC message to perform the handover. The container may include a new C-RNTI, target gNB security algorithm identifiers for the selected security algorithms, a dedicated RACH preamble, and/or possibly some other parameters i.e. access parameters, SIBs. If RACH-less handover is configured, the container may include timing adjustment indication and optionally a preallocated uplink grant. The HO request ACK message may also include RNL/TNL information for forwarding tunnels, if necessary. As soon as the source RAN node receives the HO request ACK message, or as soon as the transmission of the handover command is initiated in the downlink, data forwarding may be initiated.

In step S713, the source RAN node may transmit a handover command which may be a RRC message, to the UE. The target RAN node may generate the RRC message to perform the handover, i.e. RRCConnectionReconfiguration message including the mobilityControlInformation, to be sent by the source RAN node towards the UE. The source RAN node may perform the necessary integrity protection and ciphering of the message. The UE may receive the RRCConnectionReconfiguration message with necessary parameters (i.e. new C-RNTI, target eNB security algorithm identifiers, and optionally dedicated RACH preamble, target eNB SIBs, etc.) and is commanded by the source eNB to perform the handover. If RACH-less handover is configured, the RRCConnectionReconfiguration may include timing adjustment indication and optionally preallocated uplink grant for accessing the target RAN node. If preallocated uplink grant is not included, the UE should monitor PDCCH of the target RAN node to receive an uplink grant. The UE may not need to delay the handover execution for delivering the HARQ/ARQ responses to source RAN node. If Make-Before-Break HO is configured, the connection to the source RAN node may be maintained after the reception of RRCConnectionReconfiguration message with mobilityControlInformation before the UE executes initial uplink transmission to the target RAN node.

In step S715, the UE may switch to a new cell i.e., the target RAN node. The UE may detach from the old cell i.e., the source RAN node and synchronize to a new cell i.e., the target RAN node. For example, the UE may perform a random access to the target RAN node. The UE may transmit a random access preamble to the target RAN node, and receive a random access response comprising an uplink grant from the target RAN node. If RACH-less handover is configured, the step S715 may be omitted, and the uplink grant may be provided in step S713. The uplink grant may be used for the UE to transmit a handover complete message to the target RAN node.

In step S717, the UE may transmit a handover complete message (i.e., RRCConnectionReconfigurationComplete message) to the target RAN node. When the UE has successfully accessed the target RAN node or received uplink grant when RACH-less HO is configured, the UE may send the RRCConnectionReconfigurationComplete message comprising a C-RNTI to confirm the handover, along with an uplink Buffer Status Report, whenever possible, to the target RAN node to indicate that the handover procedure is completed for the UE. The target RAN node may verify the C-RNTI sent in the RRCConnectionReconfigurationComplete message. The target RAN node can now begin sending data to the UE.

Hereinafter, multicast-broadcast service (MBS) is described.

MBS is a point-to-multipoint (PTM) communication scheme where data packets are transmitted simultaneously from a single source (e.g., base station and/or DU) to multiple destinations (e.g., UEs). The MBS may comprise at least one of a broadcast communication service (or, simply broadcast service) or a multicast communication service (or, simply multicast service).

In broadcast communication service, the same service and the same specific content data may be provided simultaneously to all UEs in a geographical area (i.e., all UEs in a broadcast coverage area may be authorized to receive the data). The broadcast communication service may be delivered to the UEs using a broadcast session. In the case of broadcast session, the UE can receive MBS data in RRC_IDLE, RRC_INACTIVE and/or RRC_CONNECTED state.

In multicast communication service, the same service and the same specific content data may be provided simultaneously to a dedicated set of UEs (i.e., not all UEs in a multicast coverage area may be authorized to receive the data). The multicast communication service may be delivered to the UEs using a multicast session. In the case of multicast session, the UE can receive MBS data in RRC_CONNECTED, and use additional assistance mechanisms such as feedback/retransmission and/or PTP delivery.

The geographical area may be referred to as MBS area. The MBS area may comprise at least one of the broadcast coverage area or the multicast coverage area. The MBS area may comprise one or more base stations (or, one or more DUs) transmitting the same content. Each base station capable of MBS service may belong to one or more MBS areas. A UE can receive the MBS content within the MBS area in a connected state (e.g., RRC connected mode) or idle state (e.g., RRC idle mode). A base station may provide MBS service corresponding to different MBS areas.

In MBS scheme, there may be a multicast/broadcast single-frequency network (MBSFN) transmission in which identical signals may be transmitted from multiple cells with identical coding and modulation and with timing and frequency synchronized across the multiple cells. Physical multicast channel (PMCH) may be used for the MBSFN transmission. The PMCH may also contain MBS traffic and/or control information.

Compared to the MBS, a unicast service may be defined. Unicast service is a point-to-point (PTP) communication scheme data packets are transmitted from a single source to a single destination.

MBS service may be provided via MBS bearer and/or MBS radio bearer (MRB). The MBS bearer and/or MRB may be a bearer/radio bearer used for PTM service. Further, the MBS service may also be provided via a unicast bearer. The unicast bearer may be a data radio bearer (DRB) used for PTP service. Compared to DRB, the layer 2 protocols (e.g., SDAP, PDCP, RLC, MAC) for the MBS bearer and/or MRB may be different from those for the DRB. One or more quality of service (QoS) flows may be mapped to one DRB according to a QoS flow to DRB mapping rule.

With regard to MBS, the following terms may be used:
- MBS identifier (ID): ID of MBS service subscribed by one or more UEs. The MBS ID may comprise at least one of a temporary mobile group identifier (TMGI), a multicast address or a broadcast address.
- MRB ID and/or MBS bearer ID: ID of a bearer/radio bearer that is used for MBS service.
- MRB QoS and/or MBS bearer QoS: QoS parameters that corresponds to MBS service. QoS required for the MBS service.
- MBS area ID: ID of an MBS area in which MBS service is provided.

Figure 8:
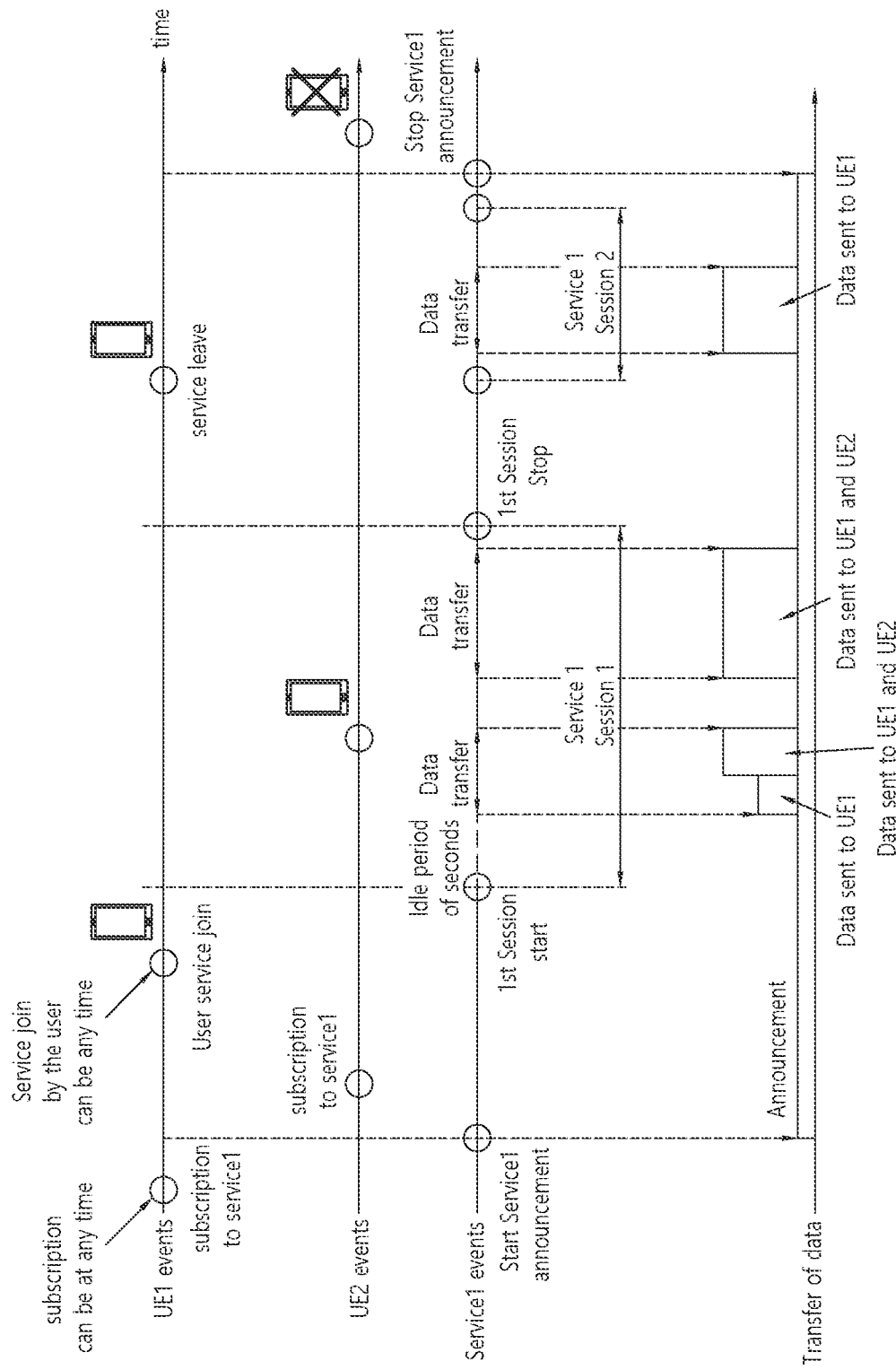
FIG. 8 shows an example of a timeline for providing a multicast service to which technical features of the present disclosure can be applied.

FIG. 8 shows an example of a timeline for providing a multicast service to which technical features of the present disclosure can be applied.

Referring to FIG. 8, reception of the multicast service may be enabled by the following sequence of phases: subscription, service announcement, joining, session start, MBS notification, data transfer, session stop and leaving. The phases subscription, joining and leaving may be performed individually per user. The other phases may be performed for a service, i.e., for all users interested in the related service. The sequence of phases may repeat, e.g.

depending on the need to transfer data. Also, the subscription, joining, leaving, service announcement as well as MBS notification may run in parallel to other phases.

The user may subscribe to the multicast service so that the relationship between the user and the service provider is established. The subscription may allow the user to receive the related multicast service.

The service announcement/discovery mechanisms shall allow users to request or be informed about the range of MBS user services available. The MBS user services may include operator specific MBS user services as well as services from content providers outside of a PLMN. Service announcement may be used to distribute to users information about the service, parameters required for service activation (e.g. IP multicast address(es)) and/or possibly other service related parameters (e.g. service start time).

The joining (i.e., MBS multicast activation by the user) may be the process by which a subscriber joins (becomes a member of) a multicast group, i.e., the user indicates to the network that the user wants to receive multicast mode data of a specific MBS bearer service. An MBS user service may also be carried by more than one MBS bearer service. In that case, the MBS user service part in the UE may initiate the relevant MBS bearer services to receive the service.

The session start may be the point at which the broadcast multicast service center (BM-SC) is ready to send data. The session start can be identified with the start of a "Multicast session". Session start may occur independently of activation of the service by the user—i.e., a given user may activate the service before or after the session start. Session start may be the trigger for bearer resource establishment for MBS data transfer. If an MBS user service is carried by more than one MBMS bearer service, a session start message may be sent for each MBS bearer service. In that case, the UE may need to initiate the reception of multiple relevant MBS bearer services to receive the MBS user service.

In the MBS notification phase, the UEs may be informed about forthcoming (and potentially about ongoing) MBS multicast data transfer.

The data transfer is the phase during which the MBS data are transferred to the UEs.

The session stop is the point at which the BM-SC determines that there will be no more data to send for a period of time. The period of time may be long enough to justify removal of bearer resources associated with the session. At session stop, the bearer resources may be released.

The leaving (i.e. MBS multicast deactivation by the user) may be the process by which a subscriber leaves (stops being a member of) a multicast group, i.e. the user no longer wants to receive multicast mode data of a specific MBS bearer service.

Figure 9:
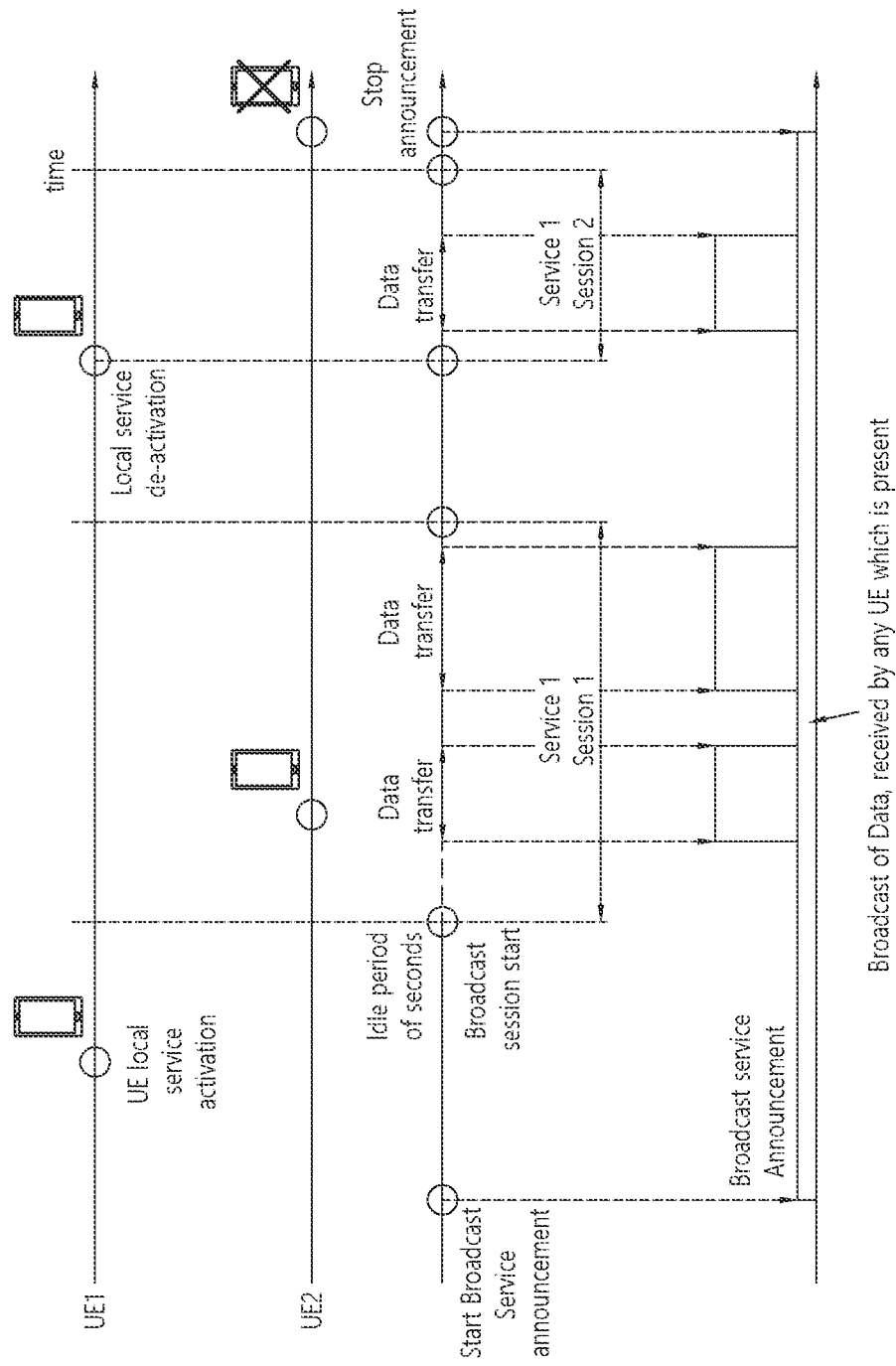
FIG. 9 shows an example of a timeline for providing a broadcast service to which technical features of the present disclosure can be applied.

FIG. 9 shows an example of a timeline for providing a broadcast service to which technical features of the present disclosure can be applied.

Referring to FIG. 9, reception of the broadcast service may be enabled by the following sequence of phases: service announcement, session start. MBS notification, data transfer and session stop. The sequence of phases may repeat, e.g. depending on the need to transfer data. It is also possible that the service announcement and MBS notification phase may run in parallel with other phases, in order to inform UEs which have not yet received the related service.

In the service announcement, the UEs may be informed about forthcoming MBS user services. The service announcement/discovery mechanisms shall allow users to request or be informed about the range of MBS user services available. The MBS user services may include operator specific MBS user services as well as services from content providers outside of a PLMN. Service announcement may be used to distribute to users information about the service, parameters required for service activation and/or possibly other service related parameters (e.g. service start time). The MBS user service part in the UE may initiate reception of the MBS bearer service to receive an MBS user service. In case one MBS user service is carried by more than one MBMS bearer service, the UE may need to initiate the reception of multiple relevant MBS bearer services to receive the MBS user service Session start may be the point at which the BM-SC is ready to send data. The session start can be identified with the start of a "Broadcast session". Session start may be the trigger for bearer resource establishment for MBS data transfer. If an MBS user service is carried by more than one MBS bearer service, a session start message may be sent for each MBS bearer service. In that case, the UE may need to initiate the reception of multiple relevant MBS bearer services to receive the MBS user service.

In the MBS notification, the UEs may be informed about forthcoming (and potentially about ongoing) MBS broadcast data transfer.

The data transfer is the phase during which the MBS data are transferred to the UEs.

The session stop is the point at which the MBS user service determines that there will be no more data to send for a period of time. The period of time may belong enough to justify removal of bearer resources associated with the service. At session stop, the bearer resources may be released.

Meanwhile, basic mobility with service continuity may need to be supported in MBS service provision/reception. For example, a handover of a MBS UE (i.e., UE which subscribed to MBS service) may be considered. Service continuity may be an issue to solve in case the target node has no MBS resources to serve the UE. Or, in the source side, the MBS service may be served with a unicast bearer, while the target node may decide to serve the MBS service with the MBS bearer since the target node has the MBS service on-going.

Therefore, various embodiments of the present disclosure may provide solutions for supporting a MBS UE's bearer type change during a mobility procedure (e.g., handover progress).

The following drawings are created to explain specific embodiments of the present disclosure. The names of the specific devices or the names of the specific signals/messages/fields shown in the drawings are provided by way of example, and thus the technical features of the present disclosure are not limited to the specific names used in the following drawings.

Figure 10:
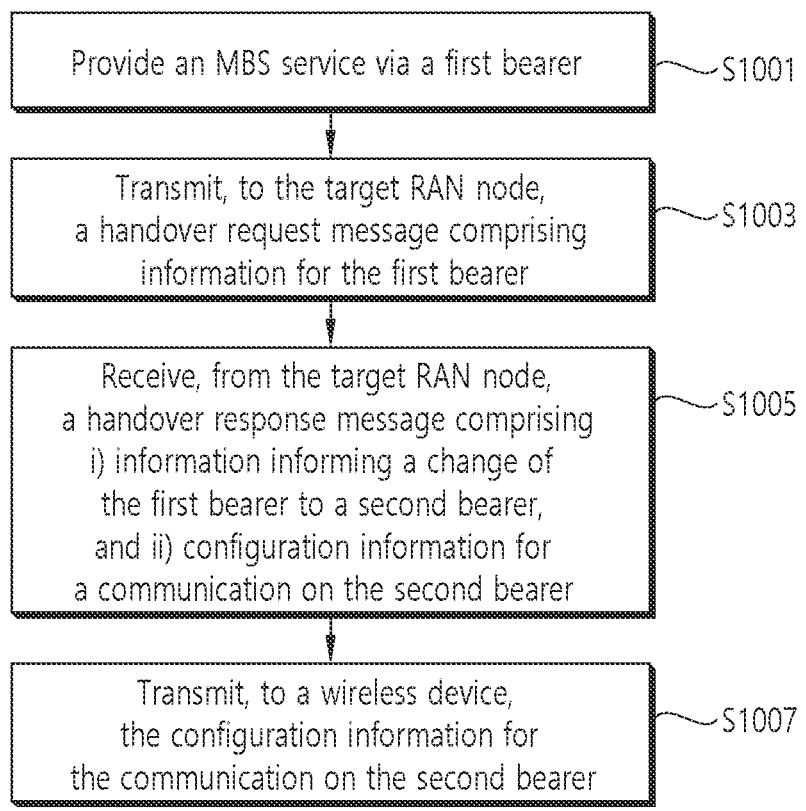
FIG. 10 shows an example of a method for a bearer type change in a mobility procedure in a RAN side according to an embodiment of the present disclosure.

FIG. 10 shows an example of a method for a bearer type change in a mobility procedure in a RAN side according to an embodiment of the present disclosure. Steps illustrated in FIG. 10 may be performed by a source RAN node in a mobility procedure to a target RAN node.

Referring to FIG. 10, in step S1001, the source RAN node may provide an MBS service via a first bearer.

In step S1003, the source RAN node may transmit, to the target RAN node, a handover request message comprising information for the first bearer.

In step S1005, the source RAN node may receive, from the target RAN node, a handover response message comprising i) information informing a change of the first bearer to a second bearer, and ii) configuration information for a communication on the second bearer.

In step S1007, the source RAN node may transmit, to a wireless device, the configuration information for the communication on the second bearer.

Basically, the change of the first bearer to the second bearer may be determined based on the information for the first bearer, since the target RAN node can know that the information for the first bearer is currently used for the source RAN node to provide the MBS service.

The change of the first bearer to the second bearer may be determined based on an amount of MBS resources (i.e., resources that can be used for providing the MBS service via MBS bearer) available at the target RAN node. For example, if/when the amount of MBS resources available at the target RAN node is small (i.e., less than a threshold) or there are no MBS resources available at the target RAN node, the target RAN node may determine that a bearer type needs to be changed to the unicast bearer. For another example, if/when the amount of MBS resources available at the target RAN node is large (i.e., more than the threshold), the target RAN node may determine that a bearer type can be changed to the MBS bearer.

The change of the first bearer to the second bearer may be determined based on whether the MBS service can be provided via the second bearer at the target RAN node. For example, if/when an MBS service is on-going via the MBS bearer at the target RAN node, the target RAN node may determine that a bearer type can be changed to the MBS bearer. For another example, if/when an MBS service is not on-going via the MBS bearer at the target RAN node, the target RAN node may determine that a bearer type needs to be changed to the unicast bearer.

The handover response message may further comprise data forwarding information for the second bearer. The data forwarding information comprises a GTP tunnel endpoint identifier (TEID) for the second bearer. The data forwarding information may be included in the configuration information for the communication on the second bearer.

The first bearer may be an MBS bearer and the second bearer may be a unicast bearer. The information for the first bearer may comprise at least one of an MBS identifier (ID) related to the MBS service, MBS radio bearer (MRB) ID related to the first bearer, or MRB quality of service (QoS) related to the first bearer.

The MBS ID may comprise at least one of a temporary mobile group identifier (TMGI), a multicast address or a broadcast address.

After transmitting the configuration information to the wireless device, the MBS service may be provided via the unicast bearer to the wireless device based on the configuration information.

The first bearer may be a unicast bearer and the second bearer may be an MBS bearer. The information for the first bearer may comprise at least one of quality of service (QoS) flow to data radio bearer (DRB) mapping rule or DRB identifier (ID) informing that the unicast bearer is for the MBS service.

The handover response message may further comprise at least one of MBS bearer information comprising at least one of an MBS ID related to the MBS service, MRB ID related to the second bearer, or MRB QoS related to the second bearer; or MBS configuration information comprising at least one of radio resource information for the second bearer or layer 1 (L1)/layer 2 (L2) related bearer information for the second bearer.

The MBS configuration information may be included in the configuration information for the communication on the second bearer. The MBS configuration information may comprise at least one of: the MBS bearer information; a physical multicast channel (PMCH) configuration including at least one of allocated subframes, modulation and condign scheme (MCS) or multicast channel (MCH) scheduling period; a logical channel ID; a multicast broadcast single frequency network (MBSFN) subframe configuration including at least one of a radio frame allocation period, a radio frame allocation offset or a subframe allocation; a command subframe period; or an MBS area ID related to the MBS service.

After transmitting the configuration information to the wireless device, the MBS service may be provided via the MBS bearer to the wireless device based on the configuration information.

Figure 11:
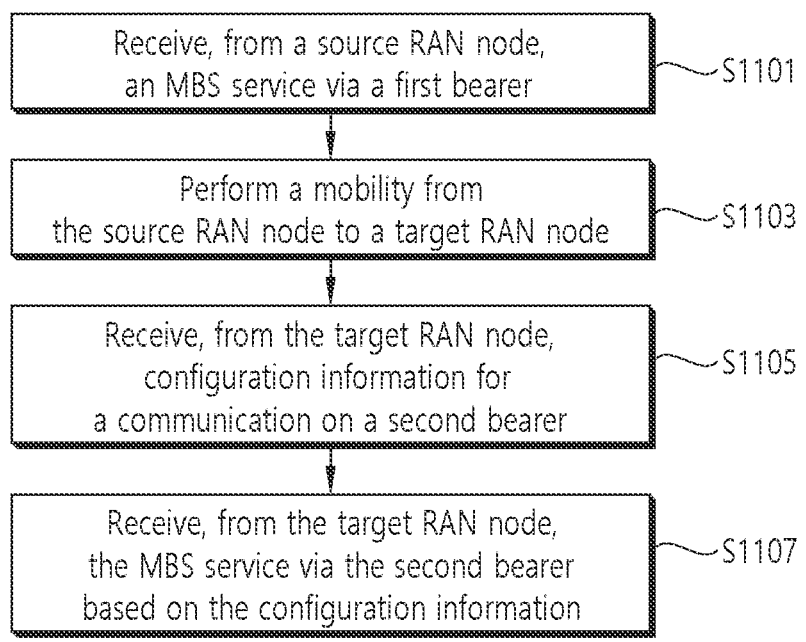
FIG. 11 shows an example of a method for a bearer type change in a mobility procedure in a UE side according to an embodiment of the present disclosure.

FIG. 11 shows an example of a method for a bearer type change in a mobility procedure in a UE side according to an embodiment of the present disclosure. Steps illustrated in FIG. 11 may be performed by a wireless device and/or a UE.

Referring to FIG. 11, in step S1101, the wireless device may receive, from a source RAN node, an MBS service via a first bearer.

In step S1103, the wireless device may perform a mobility from the source RAN node to a target RAN node.

In step S1105, the wireless device may receive, from the target RAN node, configuration information for a communication on a second bearer. Before receiving the configuration information: a handover request message comprising information for the first bearer is transmitted from the source RAN node to the target RAN node; and a handover response message comprising i) information informing a change of the first bearer to the second bearer, and ii) the configuration information for the communication on the second bearer is transmitted from the target RAN node to the source RAN node, in response to the handover request message.

In step S1107, the wireless device may receive, from the target RAN node, the MBS service via the second bearer based on the configuration information.

Figure 12:
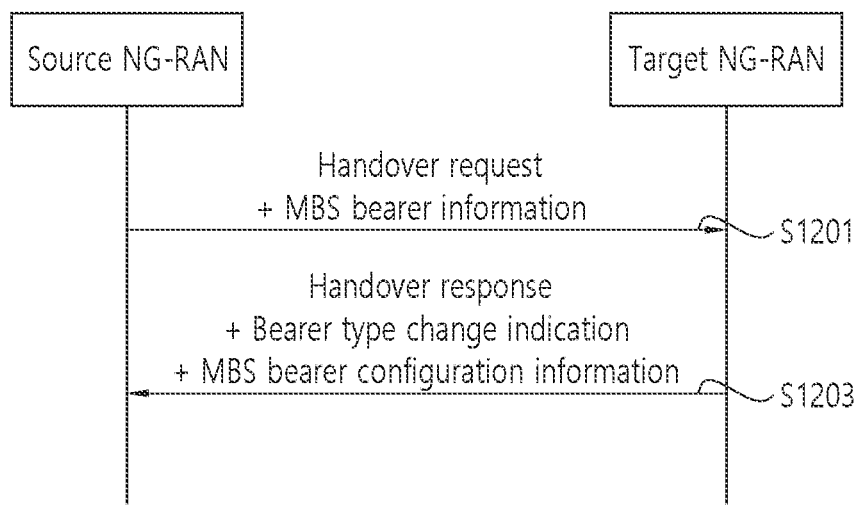
FIG. 12 shows an example of at least part of a handover procedure for MBS with bearer type change according to an embodiment of the present disclosure.

FIG. 12 shows an example of at least part of a handover procedure for MBS with bearer type change according to an embodiment of the present disclosure.

The handover procedure may be triggered for a UE which is receiving MBS service either by a multicast bearer or a unicast bearer from a source RAN node, if/when the UE has to be handed over to a target RAN node.

In step S1201, the source RAN node may transmit a handover request message to the target RAN node. The handover request message may comprise information for a first bearer (i.e., a bearer that is currently used by the source RAN node to provide MBS service). The information for the first bearer may comprise at least one of i) MBS bearer information or ii) if served in unicast mode, QoS flow to DRB mapping rule and/or DRB ID indicating that the DRB is for MBS service. The MBS bearer information may comprise at least one of an MBS ID related to the MBS service, MRB ID related to the first bearer, or MRB QoS related to the first bearer. The MBS ID may comprise at least one of a TMGI, a multicast address or a broadcast address.

In step S1203, if/when the target RAN node received the handover request message, the target RAN node may check the information for the first bearer above and also decide whether the bearer type should be changed or not based on a current resource situation at the target RAN node and/or an availability of MBS services (through MRB or through unicast bearer). That is, the target RAN node may determine to change the first bearer to a second bearer (i.e., a bearer used/to be used by the target RAN node to provide MBS service after handover) based on at least one of an amount of resources available at the target RAN node or whether the MBS service can be provided via the second bearer at the target RAN node. If the target RAN node decides to change the bearer type for the UE on the specific MBS service, the target RAN node may give a handover response message to the source RAN node.

The handover response message may comprise at least one of information informing a change of the first bearer to the second bearer (i.e., indication that the first bearer has been changed from a unicast bearer to an MBS bearer, or from the MBS bearer to the unicast bearer), configuration information for a communication on the second bearer, or data forwarding information for the second bearer. The data forwarding information may comprise a GTP TEID for the second bearer. The data forwarding information may be included in the configuration information for the communication on the second bearer.

For example, the response message may comprise at least one of:
1) MBS bearer information comprising at least one of an MBS ID related to the MBS service, MRB ID related to the second bearer, or MRB QoS related to the second bearer;
2) Indication that the first bearer has been changed from a unicast bearer to an MBS bearer, or from the MBS bearer to the unicast bearer;
3) MBS configuration information comprising at least one of radio resource information for the second bearer or L1/L2 related bearer information for the second bearer; or
4) Data forwarding information for the second bearer, including a GTP TEID for the second bearer.

For example, the MBS configuration information may be included in the configuration information for the communication on the second bearer. The MBS configuration information may comprise at least one of:
the MBS bearer information;
a physical multicast channel (PMCH) configuration including at least one of allocated subframes, modulation and condign scheme (MCS) or multicast channel (MCH) scheduling period;
a logical channel ID;
a multicast broadcast single frequency network (MBSFN) subframe configuration including at least one of a radio frame allocation period, a radio frame allocation offset or a subframe allocation;
a command subframe period; or
an MBS area ID related to the MBS service.

When the source RAN node received the handover response message including the indication and/or the configuration information above, the source RAN node can know that the target RAN node would serve the UE with the changed bearer type (i.e., second bearer). The source RAN node may give a configuration to the UE by RRC message on the changed bearer type, also the configuration information and/or MBS configuration information. The UE may apply the parameters in the configuration information if/when the UE is handed over to the target RAN node.

For example, UE's unicast bearer for the MBS service can be changed to MRB for the MBS service. The target RAN node may provide the MBS service via the MBS bearer to the wireless device based on the configuration information.

For example, UE's MRB may be changed to unicast bearer for the MBS service. The target RAN node may provide the MBS service via the unicast bearer to the wireless device based on the configuration information.

Hereinafter, an apparatus for a source RAN node in a mobility procedure to a target RAN node in a wireless communication system, according to some embodiments of the present disclosure, will be described.

For example, the source RAN node may include at least one of a processor, a transceiver, and a memory. The at least one processor may be configured to be coupled operably with the memory and the transceiver.

The at least one processor may be configured to provide an MBS service via a first bearer. The at least one processor may be configured to control the transceiver to transmit, to the target RAN node, a handover request message comprising information for the first bearer. The at least one processor may be configured to receive, from the target RAN node, a handover response message comprising i) information informing a change of the first bearer to a second bearer, and ii) configuration information for a communication on the second bearer. The at least one processor may be configured to control the transceiver to transmit, to a wireless device, the configuration information for the communication on the second bearer.

Basically, the change of the first bearer to the second bearer may be determined based on the information for the first bearer, since the target RAN node can know that the information for the first bearer is currently used for the source RAN node to provide the MBS service.

The change of the first bearer to the second bearer may be determined based on an amount of MBS resources (i.e., resources that can be used for providing the MBS service via MBS bearer) available at the target RAN node. For example, if/when the amount of MBS resources available at the target RAN node is small (i.e., less than a threshold) or there are no MBS resources available at the target RAN node, the target RAN node may determine that a bearer type needs to be changed to the unicast bearer. For another example, if/when the amount of MBS resources available at the target RAN node is large (i.e., more than the threshold), the target RAN node may determine that a bearer type can be changed to the MBS bearer.

The change of the first bearer to the second bearer may be determined based on whether the MBS service can be provided via the second bearer at the target RAN node. For example, if/when an MBS service is on-going via the MBS bearer at the target RAN node, the target RAN node may determine that a bearer type can be changed to the MBS bearer. For another example, if/when an MBS service is not on-going via the MBS bearer at the target RAN node, the target RAN node may determine that a bearer type needs to be changed to the unicast bearer.

The handover response message may further comprise data forwarding information for the second bearer. The data forwarding information comprises a GTP tunnel endpoint identifier (TEID) for the second bearer. The data forwarding information may be included in the configuration information for the communication on the second bearer.

The first bearer may be an MBS bearer and the second bearer may be a unicast bearer. The information for the first bearer may comprise at least one of an MBS identifier (ID) related to the MBS service, MBS radio bearer (MRB) ID related to the first bearer, or MRB quality of service (QoS) related to the first bearer.

The MBS ID may comprise at least one of a temporary mobile group identifier (TMGI), a multicast address or a broadcast address.

After transmitting the configuration information to the wireless device, the MBS service may be provided via the unicast bearer to the wireless device based on the configuration information.

The first bearer may be a unicast bearer and the second bearer may be an MBS bearer. The information for the first bearer may comprise at least one of quality of service (QoS) flow to data radio bearer (DRB) mapping rule or DRB identifier (ID) informing that the unicast bearer is for the MBS service.

The handover response message may further comprise at least one of: MBS bearer information comprising at least one of an MBS ID related to the MBS service, MRB ID related to the second bearer, or MRB QoS related to the second bearer; or MBS configuration information comprising at least one of radio resource information for the second bearer or layer 1 (L1)/layer 2 (L2) related bearer information for the second bearer.

The MBS configuration information may be included in the configuration information for the communication on the second bearer. The MBS configuration information may comprise at least one of: the MBS bearer information; a physical multicast channel (PMCH) configuration including at least one of allocated subframes, modulation and condign scheme (MCS) or multicast channel (MCH) scheduling period; a logical channel ID; a multicast broadcast single frequency network (MBSFN) subframe configuration including at least one of a radio frame allocation period, a radio frame allocation offset or a subframe allocation; a command subframe period; or an MBS area ID related to the MBS service.

After transmitting the configuration information to the wireless device, the MBS service may be provided via the MBS bearer to the wireless device based on the configuration information.

Hereinafter, an apparatus for a wireless device in a wireless communication system, according to some embodiments of the present disclosure, will be described.

For example, the wireless device may include at least one of a processor, a transceiver, and a memory. The at least one processor may be configured to be coupled operably with the memory and the transceiver.

The at least one processor may be configured to control the transceiver to receive, from a source RAN node, an MBS service via a first bearer. The at least one processor may be configured to perform a mobility from the source RAN node to a target RAN node. The at least one processor may be configured to control the transceiver to receive, from the target RAN node, configuration information for a communication on a second bearer. The at least one processor may be configured to control the transceiver to receive, from the target RAN node, the MBS service via the second bearer based on the configuration information. Before receiving the configuration information: a handover request message comprising information for the first bearer is transmitted from the source RAN node to the target RAN node; and a handover response message comprising i) information informing a change of the first bearer to the second bearer, and ii) the configuration information for the communication on the second bearer is transmitted from the target RAN node to the source RAN node, in response to the handover request message.

Hereinafter, a processor for a source RAN node in a mobility procedure to a target RAN node in a wireless communication system, according to some embodiments of the present disclosure, will be described.

The processor may be configured to provide an MBS service via a first bearer. The processor may be configured to transmit, to the target RAN node, a handover request message comprising information for the first bearer. The processor may be configured to receive, from the target RAN node, a handover response message comprising i) information informing a change of the first bearer to a second bearer, and ii) configuration information for a communication on the second bearer. The processor may be configured to control the transceiver to transmit, to a wireless device, the configuration information for the communication on the second bearer.

Hereinafter, a processor for a wireless device in a wireless communication system, according to some embodiments of the present disclosure, will be described.

The processor may be configured to receive, from a source RAN node, an MBS service via a first bearer. The processor may be configured to perform a mobility from the source RAN node to a target RAN node. The processor may be configured to receive, from the target RAN node, configuration information for a communication on a second bearer. The processor may be configured to receive, from the target RAN node, the MBS service via the second bearer based on the configuration information. Before receiving the configuration information: a handover request message comprising information for the first bearer is transmitted from the source RAN node to the target RAN node; and a handover response message comprising i) information informing a change of the first bearer to the second bearer, and ii) the configuration information for the communication on the second bearer is transmitted from the target RAN node to the source RAN node, in response to the handover request message.

Hereinafter, a non-transitory computer-readable medium has stored thereon a plurality of instructions for a source RAN node in a mobility procedure to a target RAN node in a wireless communication system, according to some embodiments of the present disclosure, will be described.

According to some embodiment of the present disclosure, the technical features of the present disclosure could be embodied directly in hardware, in a software executed by a processor, or in a combination of the two. For example, a method performed by a wireless device in a wireless communication may be implemented in hardware, software, firmware, or any combination thereof. For example, a software may reside in RAM memory, flash memory. ROM memory, EPROM memory, EEPROM memory, registers, hard disk, a removable disk, a CD-ROM, or any other storage medium.

Some example of storage medium is coupled to the processor such that the processor can read information from the storage medium. In the alternative, the storage medium may be integral to the processor. The processor and the storage medium may reside in an ASIC. For other example, the processor and the storage medium may reside as discrete components.

The computer-readable medium may include a tangible and non-transitory computer-readable storage medium.

For example, non-transitory computer-readable media may include random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, or any other medium that can be used to store instructions or data structures. Non-transitory computer-readable media may also include combinations of the above.

In addition, the method described herein may be realized at least in part by a computer-readable communication medium that carries or communicates code in the form of instructions or data structures and that can be accessed, read, and/or executed by a computer.

According to some embodiment of the present disclosure, a non-transitory computer-readable medium has stored thereon a plurality of instructions. The stored a plurality of instructions may be executed by a processor of a base station.

The stored plurality of instructions may cause the source RAN node to: provide an MBS service via a first bearer; transmit, to the target RAN node, a handover request message comprising information for the first bearer; receive, from the target RAN node, a handover response message comprising i) information informing a change of the first bearer to a second bearer, and ii) configuration information for a communication on the second bearer; and transmit, to a wireless device, the configuration information for the communication on the second bearer.

Hereinafter, a non-transitory computer-readable medium has stored thereon a plurality of instructions for a wireless device in a wireless communication system, according to some embodiments of the present disclosure, will be described.

The stored plurality of instructions may cause the wireless device to: receive, from a source RAN node, an MBS service via a first bearer; perform a mobility from the source RAN node to a target RAN node; receive, from the target RAN node, configuration information for a communication on a second bearer; and receive, from the target RAN node, the MBS service via the second bearer based on the configuration information. Before receiving the configuration information: a handover request message comprising information for the first bearer is transmitted from the source RAN node to the target RAN node; and a handover response message comprising i) information informing a change of the first bearer to the second bearer, and ii) the configuration information for the communication on the second bearer is transmitted from the target RAN node to the source RAN node, in response to the handover request message.

The present disclosure may have various advantageous effects.

For example, the target RAN node may determine whether to use unicast bearer or MBS bearer if/when a UE is handed over to the target RAN node based on information from source RAN node, current resource situation and/or MBS service availability at the target RAN node. Therefore, service continuity may be satisfied during the mobility procedure and the target RAN node may utilize radio resources more efficiently.

Advantageous effects which can be obtained through specific embodiments of the present disclosure are not limited to the advantageous effects listed above. For example, there may be a variety of technical effects that a person having ordinary skill in the related art can understand and/or derive from the present disclosure. Accordingly, the specific effects of the present disclosure are not limited to those explicitly described herein, but may include various effects that may be understood or derived from the technical features of the present disclosure.

Claims in the present disclosure can be combined in a various way. For instance, technical features in method claims of the present disclosure can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method. Other implementations are within the scope of the following claims.

The invention claimed is:

1. A method performed by a source radio access network (RAN) node in a mobility procedure to a target RAN node in a wireless communication system, the method comprising:
providing a multicast-broadcast service (MBS) service to a wireless device via a first bearer based on configuration information related to the first bearer;
transmitting, to the target RAN node, a handover request message comprising bearer information for the first bearer;
receiving, from the target RAN node, a handover response message comprising i) information for a bearer change from the first bearer to a second bearer, and ii) configuration information related to the second bearer,
wherein the bearer change is determined by the target RAN node based on at least one of an availability of MBS resources at the target RAN node, or whether there is on-going service provided via an MBS bearer at the target RAN node; and
transmitting, to the wireless device, the configuration information related to the second bearer,
wherein each of the first bearer and the second bearer comprises a bearer among an MBS bearer or a unicast bearer.

2. The method of claim 1, wherein the handover response message further comprises data forwarding information for the second bearer, and
wherein the data forwarding information comprises a general packet radio service (GPRS) tunneling protocol (GTP) tunnel endpoint identifier (TEID) for the second bearer.

3. The method of claim 2, wherein the data forwarding information is included in the configuration information related to the second bearer.

4. The method of claim 1, wherein the first bearer is an MBS bearer and the second bearer is a unicast bearer,
wherein the information for the first bearer comprises at least one of an MBS identifier (ID) related to the MBS service, MBS radio bearer (MRB) ID related to the first bearer, or MRB quality of service (QOS) related to the first bearer.

5. The method of claim 4, wherein the MBS ID comprises at least one of a temporary mobile group identifier (TMGI), a multicast address or a broadcast address.

6. The method of claim 4, after the configuration information related to the second bearer is transmitted to the wireless device, the MBS service is provided via the unicast bearer to the wireless device based on the configuration information related to the second bearer.

7. The method of claim 1, wherein the first bearer is a unicast bearer and the second bearer is an MBS bearer, and
wherein the information for the first bearer comprises at least one of quality of service (QoS) flow to data radio bearer (DRB) mapping rule or DRB identifier (ID) informing that the unicast bearer is for the MBS service.

8. The method of claim 7, wherein the handover response message further comprises at least one of:
MBS bearer information comprising at least one of an MBS ID related to the MBS service, MRB ID related to the second bearer, or MRB QOS related to the second bearer; or
MBS configuration information comprising at least one of radio resource information for the second bearer or layer 1 (L1)/layer 2 (L2) related bearer information for the second bearer.

9. The method of claim 8, wherein the MBS configuration information is included in the configuration information related to the second bearer, and
wherein the MBS configuration information comprises at least one of:
the MBS bearer information;
a physical multicast channel (PMCH) configuration including at least one of allocated subframes, modulation and condign scheme (MCS) or multicast channel (MCH) scheduling period;
a logical channel ID;
a multicast broadcast single frequency network (MBSFN) subframe configuration including at least one of a radio frame allocation period, a radio frame allocation offset or a subframe allocation;
a command subframe period; or
an MBS area ID related to the MBS service.

10. The method of claim 9, after the configuration information related to the second bearer is transmitted to the wireless device, the MBS service is provided via the MBS bearer to the wireless device based on the configuration information related to the second bearer.

11. The method of claim 1, wherein the wireless device is in communication with at least one of a user equipment, a network, or autonomous vehicles.

12. A source radio access network (RAN) node configured to operate in a mobility procedure to a target RAN node in a wireless communication system, the source RAN node comprising:
a transceiver;
a memory; and
at least one processor operatively coupled to the transceiver and the memory,
wherein the memory stores instructions that, based on being executed by the at least one processor, perform operations comprising:
providing a multicast-broadcast service (MBS) service to a wireless device via a first bearer based on configuration information related to the first bearer;
transmitting, to the target RAN node, a handover request message comprising bearer information for the first bearer;
receiving, from the target RAN node, a handover response message comprising i) information for a bearer change from the first bearer to a second bearer, and ii) configuration information on related to the second bearer,
wherein the bearer change is determined by the target RAN node based on at least one of an availability of MBS resources at the target RAN node, or whether there is on-going service provided via an MBS bearer at the target RAN node; and
transmitting, to the wireless device, the configuration information related to the second bearer,
wherein each of the first bearer and the second bearer comprises a bearer among an MBS bearer or a unicast bearer.

13. A wireless device configured to operate in a wireless communication system, the wireless device comprising:
a transceiver;
a memory; and
at least one processor operatively coupled to the transceiver and the memory,
wherein the memory stores instructions that, based on being executed by the at least one processor, perform operations comprising:
receiving, from a source radio access network (RAN) node, a multicast-broadcast service (MBS) service via a first bearer based on configuration information related to the first bearer,
wherein a handover request message comprising bearer information for the first bearer is transmitted from the source RAN node to a target RAN node,
wherein a handover response message comprising i) information for a bearer change from the first bearer to a second bearer, and ii) configuration information related to the second bearer is transmitted from the target RAN node to the source RAN node, and
wherein the bearer change is determined by the target RAN node based on at least one of an availability of MBS resources at the target RAN node, or whether there is on-going service provided via an MBS bearer at the target RAN node;
receiving, from the source RAN node, the configuration information related to the second bearer;
performing a mobility from the source RAN node to the target RAN node; and
receiving, from the target RAN node, an MBS service via the second bearer based on the configuration information related to the second bearer,
wherein each of the first bearer and the second bearer comprises a bearer among an MBS bearer or a unicast bearer.

* * * * *